US007103558B1

(12) United States Patent
Patton et al.

(10) Patent No.: US 7,103,558 B1
(45) Date of Patent: Sep. 5, 2006

(54) SYSTEM AND METHOD FOR DETERMINING THE ORIGIN AND DESTINATION SERVICES OF A TRAVEL ITINERARY

(75) Inventors: Richard E. Patton, Webster Groves, MO (US); Aaron D. Hall, Wildwood, MO (US)

(73) Assignee: Carlson Wagonlit Travel, Inc., Minneapolis, MN (US)

( * ) Notice: Subject to any disclaimer, the term of this patent is extended or adjusted under 35 U.S.C. 154(b) by 136 days.

(21) Appl. No.: 09/603,969

(22) Filed: Jun. 26, 2000

(51) Int. Cl.
G06Q 10/00 (2006.01)
(52) U.S. Cl. ......................................................... 705/6
(58) Field of Classification Search .................. 705/1, 705/5, 6, 26, 27.1; 235/381; 707/200, 201
See application file for complete search history.

(56) References Cited

U.S. PATENT DOCUMENTS

| 4,449,186 | A | * | 5/1984 | Kelly et al. | |
|---|---|---|---|---|---|
| 4,862,357 | A | * | 8/1989 | Ahlstrom et al. | |
| 5,191,523 | A | | 3/1993 | Whitesage | 364/407 |
| 5,237,499 | A | | 8/1993 | Garback | 364/407 |
| 5,253,166 | A | | 10/1993 | Dettelbach et al. | 364/407 |
| 5,270,921 | A | | 12/1993 | Hornick | 364/407 |
| 5,331,546 | A | | 7/1994 | Webber et al. | 364/407 |
| 5,422,809 | A | | 6/1995 | Griffin et al. | 364/407 |
| 5,802,492 | A | | 9/1998 | DeLorme et al. | 701/200 |
| 5,832,453 | A | | 11/1998 | O'Brien | 705/6 |
| 5,897,620 | A | | 4/1999 | Walker et al. | 705/6 |
| 5,918,209 | A | | 6/1999 | Campbell et al. | 705/5 |
| 5,924,075 | A | | 7/1999 | Kanemitsu | 705/6 |
| 5,940,803 | A | | 8/1999 | Kanemitsu | 705/6 |
| 5,948,040 | A | | 9/1999 | DeLorme et al. | 701/201 |
| 5,953,706 | A | * | 9/1999 | Patel | |
| 6,003,009 | A | | 12/1999 | Nishimura | 705/5 |
| 6,023,679 | A | | 2/2000 | Acebo et al. | 705/5 |

FOREIGN PATENT DOCUMENTS

WO    WO 01/75741    * 10/2001

OTHER PUBLICATIONS

Southwest Airlines web page; Wayback Machine archive; May 20, 2000; 1 page.*

* cited by examiner

*Primary Examiner*—Thomas A. Dixon
(74) *Attorney, Agent, or Firm*—Schwegman, Lundberg, Woessner & Kluth, P.A.

(57) ABSTRACT

A system and method for determining one or more origin and destination (O&D) services for a travel itinerary. The method comprises the steps of inputting itinerary data into the processor, determining one or more O&D services for the itinerary by applying a multi-level test, and outputting the O&D services. The invention also includes a system for determining one or more O&D services for a travel itinerary. The system comprises a storage device, a processor, testing software that selectively applies a first and second test set, and determining software responsive to the testing software that determines the O&D services for the travel itinerary. The invention also includes a method for determining travel cost information for a travel itinerary. The method includes determining one or more O&D services for the travel itinerary by applying a multi-level test, inputting derived itinerary travel costs into the processor, calculating travel costs, comparing the calculated travel costs with the derived itinerary travel costs to produce travel cost information, and outputting the travel cost information.

36 Claims, 9 Drawing Sheets

SYSTEM AND METHOD FOR DETERMINING THE ORIGIN AND DESTINATION SERVICES OF A TRAVEL ITINERARY

NOTICE

Copyright© 2000 Maritz Inc. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to a system and method in the travel industry. In particular, this invention relates to a system and method for determining one or more origin and destination (O&D) services for an itinerary by applying a multi-level test to the itinerary.

2. Description of the Prior Art

Trip analysis became important to travel managers as airlines set up hub-and-spoke route networks in the late 1970's and early 1980's. Since that time, travel reporting systems have used a variety of methods to derive O&D.

Some systems use "stopover indicators" on an airline ticket. These indicators (an "X" for a connection and an "O" for a stopover) are a ticket-pricing byproduct. While useful as an ingredient of an O&D determination, stopover indicators by themselves cannot produce accurate O&D.

Other systems use "fare break points" on an airline ticket. Akin to stopover indicators, fare break points are the points in an itinerary that are explicitly priced. These do not always accurately indicate O&D.

Other systems use the time spent at a location. Some reporting systems use a minimum specified amount of time, e.g., four hours, to indicate a stopover. Some systems use one minimum for "domestic" travel and a different minimum for "international" travel. While consideration of time spent at a location is a key indication of O&D, time alone is a less accurate indicator of O&D. A more accurate O&D determination system is needed.

SUMMARY OF THE INVENTION

It is an object of this invention to provide an O&D service system that considers relationships between non-consecutive segments, as well as relationships between consecutive segments.

It is an object of this invention to provide an O&D service system that gives the most weight to data known to be generally the most reliable and avoids or gives less weight to data known to be generally the least reliable.

It is an object of this invention to provide an O&D service system that uses logic to reject or ignore some data it regards as misleading.

It is an object of this invention to provide an O&D service system that functions even with a substantial amount of data absent, requiring only the sequence of trip locations from start to finish.

It is an object of this invention to provide an O&D service system that compensates for missing data by using tests that would not have been considered had the missing data been available.

It is an object of this invention to provide an O&D service system that provides improved results as more of the requested data is made available to it.

It is an object of this invention to provide an O&D service system that distinguishes between domestic and international travel, recognizing that the rules for determining O&D are different for international travel as compared to domestic travel.

It is an object of this invention to provide an O&D service system that allows the user to define country groups to broaden the definition of domestic travel, allowing reported O&D services to more closely match the true intent of the traveler.

It is an object of this invention to provide an O&D service system that uses traveler movement among country groups as one of the possible determinants of O&D services.

It is an object of this invention to provide an O&D service system that handles an itinerary of an essentially unlimited number of segments, and reports O&D services with an essentially unlimited number of connecting points.

It is an object of this invention to provide an O&D service system that is conservative in its designation of connecting points to avoid nonsensical results, especially in those cases where a significant amount of data is missing.

It is an object of this invention to provide an O&D service system that determines O&D costs for a travel itinerary.

In one form, the invention includes a method for determining one or more O&D services for a travel itinerary having segments stored in a computing system having a processor operating according to an accompanying program instruction set. The method comprises the steps of:

inputting itinerary data derived from the itinerary into the processor;

determining one or more O&D services for the itinerary by applying a multi-level test to the itinerary data; and outputting the O&D services from the tested itinerary data.

In another form, the invention comprises a computer-implemented system which implements a program for determining one or more O&D services for a travel itinerary having segment data stored in a computing system having a processor operating according to an accompanying program instruction set. The system comprises an input system which inputs itinerary data derived from the itinerary into the processor, an evaluation system which determines one or more O&D services for the itinerary by applying a multi-level test to the itinerary data, and an output system which outputs the O&D services from the tested itinerary data.

In yet another form, the invention comprises a computer-implemented system which implements a program which determines one or more O&D services for a travel itinerary having itinerary data. The system comprises a multi-level testing system which applies a multi-level test to the itinerary data, and an identification system which identifies the O&D services from the tested itinerary data.

In yet another form, the invention comprises a system for determining one or more O&D services for a travel itinerary. The system comprises a storage device storing the travel itinerary, a processor accessing the stored travel itinerary, testing software that selectively applies a first and second test set to the travel itinerary, and determining software responsive to the testing software that determines the O&D services for the travel itinerary.

In yet another form, the invention comprises an apparatus for determining one or more O&D services for a travel itinerary having segment data stored in a computing system having a processor operating according to an accompanying program instruction set. The apparatus comprises a storage device and a processor connected to the storage device where the storage device stores a program for controlling the processor. The processor is operative with the program to input itinerary data derived from the itinerary into the processor, to determine one or more O&D services for the itinerary by applying a multi-level test to the itinerary data, to output the O&D services from the tested, itinerary data.

In yet another form, the invention includes a method for determining one or more O&D services for a travel itinerary having segment data stored in a computing system having a processor operating according to an accompanying program instruction set. The method comprises the steps of:

electronically providing an input system which inputs itinerary data derived from the itinerary into the processor;

electronically providing an evaluation system which determines one or more O&D services for the itinerary by applying a multi-level test to the itinerary data; and electronically providing an output system which outputs the O&D services from the tested itinerary.

In yet another form, the invention includes a method for determining travel cost information for a travel itinerary stored in a computing system having a processor operating according to an accompanying program instruction set. The method comprises the steps of:

determining one or more O&D services for the travel itinerary by applying a multi-level test to data derived from the travel itinerary;

inputting itinerary travel costs derived from the travel itinerary into the processor;

calculating travel costs for the determined O&D services;

comparing the calculated travel costs with the derived itinerary travel costs to produce travel cost information; and outputting the travel cost information.

Other objects and features will be in part apparent and in part pointed out hereinafter.

BRIEF DESCRIPTION OF THE APPENDICES

Figure 1:
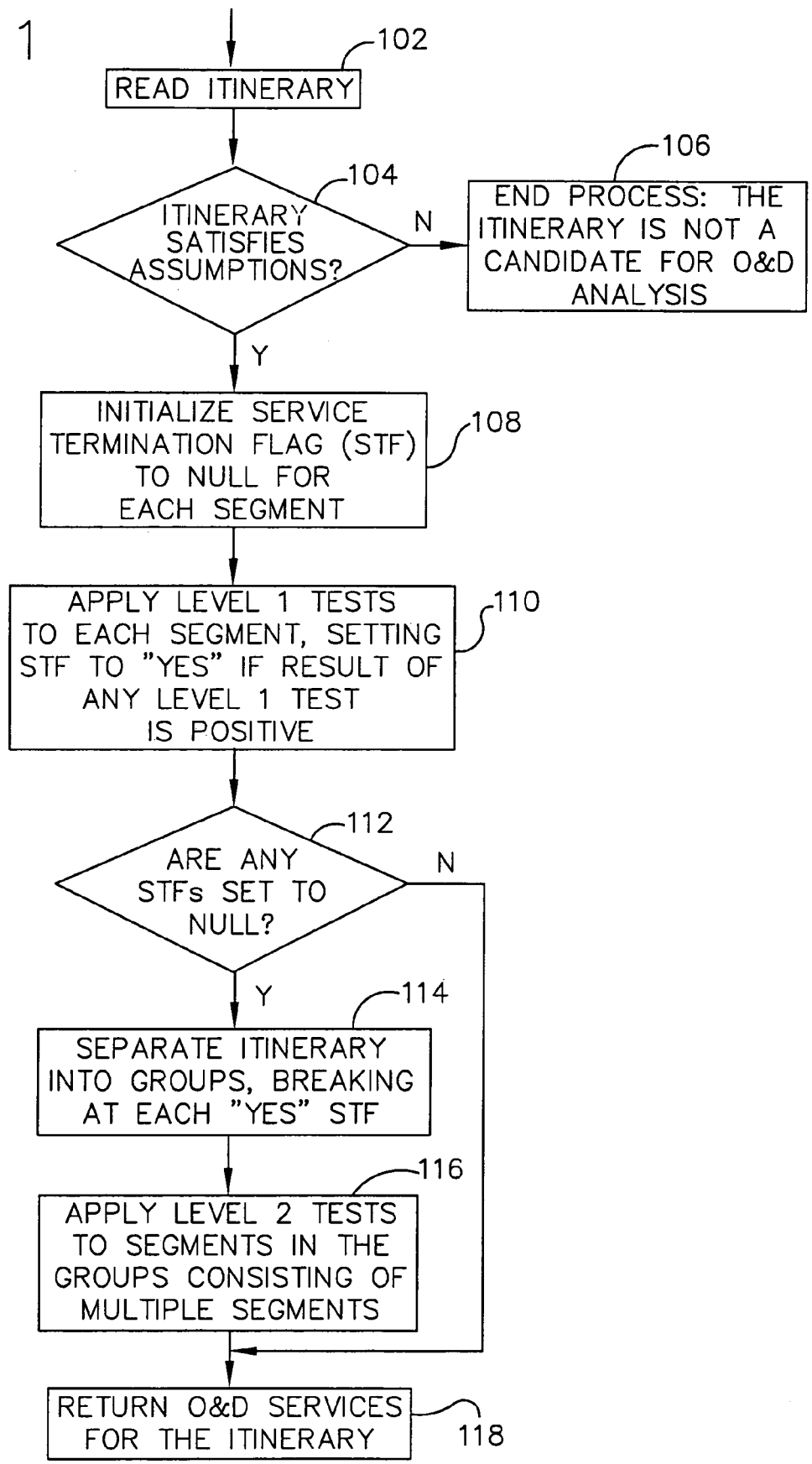
FIG. 1 is a flow chart illustrating the main steps of a preferred embodiment of the method of the invention in which O&D services are determined for a travel itinerary.

Appendix A is a glossary of terms relating to the system 200 according to the invention.

DETAILED DESCRIPTION OF PREFERRED EMBODIMENTS

In general, the system and method (hereinafter, "the system 200") of the invention determines one or more origin (or "origination") and destination (O&D) services for a travel itinerary 206 having segments stored in a computing system by applying a multi-level test to the itinerary 206. The computing system can be a personal computer or other processing system operating according to an accompanying program instruction set. Itinerary data such as the segments, departure times, and arrival times is derived from the itinerary 206 and input into a processor 202. After applying the multi-level test to the derived itinerary data, the O&D services are output and made available to a user or a calling program. Appendix A is a glossary of terms relating to the system 200.

O&D is a transportation objective: given a person's starting location, it is a series of places to which he/she "wants" to go. It is the transportation part of a "trip," reduced to its essential components. In the same sense that a pair of pants or a pair of scissors refers to one thing, so an O&D pair, sometimes called a "market pair," refers to a single "thing": the movement or planned movement of a person from one specific place to another.

O&D is expressed in terms of a point of origin (the departure locale) and a destination (the arrival locale). The universe of locales is identified by travel industry-standard codes for airports, cities, rail stations, bus terminals, and other such service locations.

The invention uses the itinerary 206, the fare calculation, and reference tables. The itinerary 206 consists of one or more travel segments. Each segment is considered separately and in the context of the whole itinerary 206. The flight segment consists of several data elements, including the ordinal number of the segment (first segment, second segment, etc.), the departure terminal code (airport, rail station, bus station, etc.), the departure date/time, the arrival terminal code, the arrival date/time, and the carrier code (airline, bus company, etc.). Other attributes of the flight segment are recorded by the invention, but are not used to determine O&D services. These attributes include the class of service and the fare basis.

The fare calculation provides a record of the calculations used to apply a fare to a ticket. The invention only uses the segment connection indicators (X's and O's). Additionally, after O&D services have been determined, the invention uses the "leg" fare, the total cost of the itinerary 206, the total base fare of the itinerary 206, and the total tax amount of the itinerary 206.

The invention depends upon information from references that are external to the itinerary 206. All but one reference come from recognized standard sources. Country groups (see below) are user-defined information. The external references include the "co-terminal" status of successive cities in the itinerary 206, the country of every point in the itinerary 206, the country group of every country in the itinerary 206, and the distance among the various points in the itinerary 206.

Referring first to FIG. 1, a flow chart illustrates the main steps of a preferred embodiment of the method of the invention in which O&D services are determined for the travel itinerary 206. The system 200 consists broadly of the following steps. After the itinerary 206 is read at 102, the itinerary 206 is qualified according to itinerary assumptions (described below) at 104. If the itinerary 206 conforms to these assumptions, then the itinerary 206 is a candidate for O&D analysis. Otherwise, the system 200 halts any further processing of the itinerary 206 at 106.

For each segment destination of a conforming itinerary, a service termination flag (STF) is initialized to null at termination point (STP) or a connection point (CP). In the following text, reference to "the STP" or "the STF" of the segment refers to the STP or the STF for the segment being tested. Such a reference does not imply that there can be only one STP or STF for the itinerary 206 (unless the itinerary 206 is comprised of one segment only). A positive STF for the segment indicates that the segment destination is classified as the STP. Similarly, reference to "the CP" refers to the CP for the segment being tested; it does not imply that there can be only one CP for the itinerary 206.

Level 1 tests (see Table 1 below) are applied to each segment at 110. If the result of any level 1 test is positive for a given segment, then the corresponding STF is set to "yes." After applying the level 1 tests, the status of each STF is determined at 112. If all STFs are set to "yes," then every segment forms its own O&D service, and processing is complete for this itinerary 206 and proceeds to 118.

If O&D services are not available for each and every segment, the itinerary 206 is processed further. Without reordering the itinerary 206, the itinerary 206 is sequentially separated into groups of segments, breaking at each positive STF at 114. The itinerary 206 will then consist of one or more segment groups. Each segment group will have zero or more segments where the destination for that segment has a null STF (O&D services are not available), followed by exactly one segment where the destination is marked as a service termination point (STP), i.e., where the destination has the STF set to "yes" (O&D services are available).

For those groups with more than one segment, the level 2 tests (see Table 2 below) corresponding to the number of segments in the group are applied at 116. The remaining STFs are marked according to the test results. For those groups with exactly one segment, no further processing is required.

After completing the above steps, the O&D services are returned to the calling program and processing ends at 118.

Figure 2:
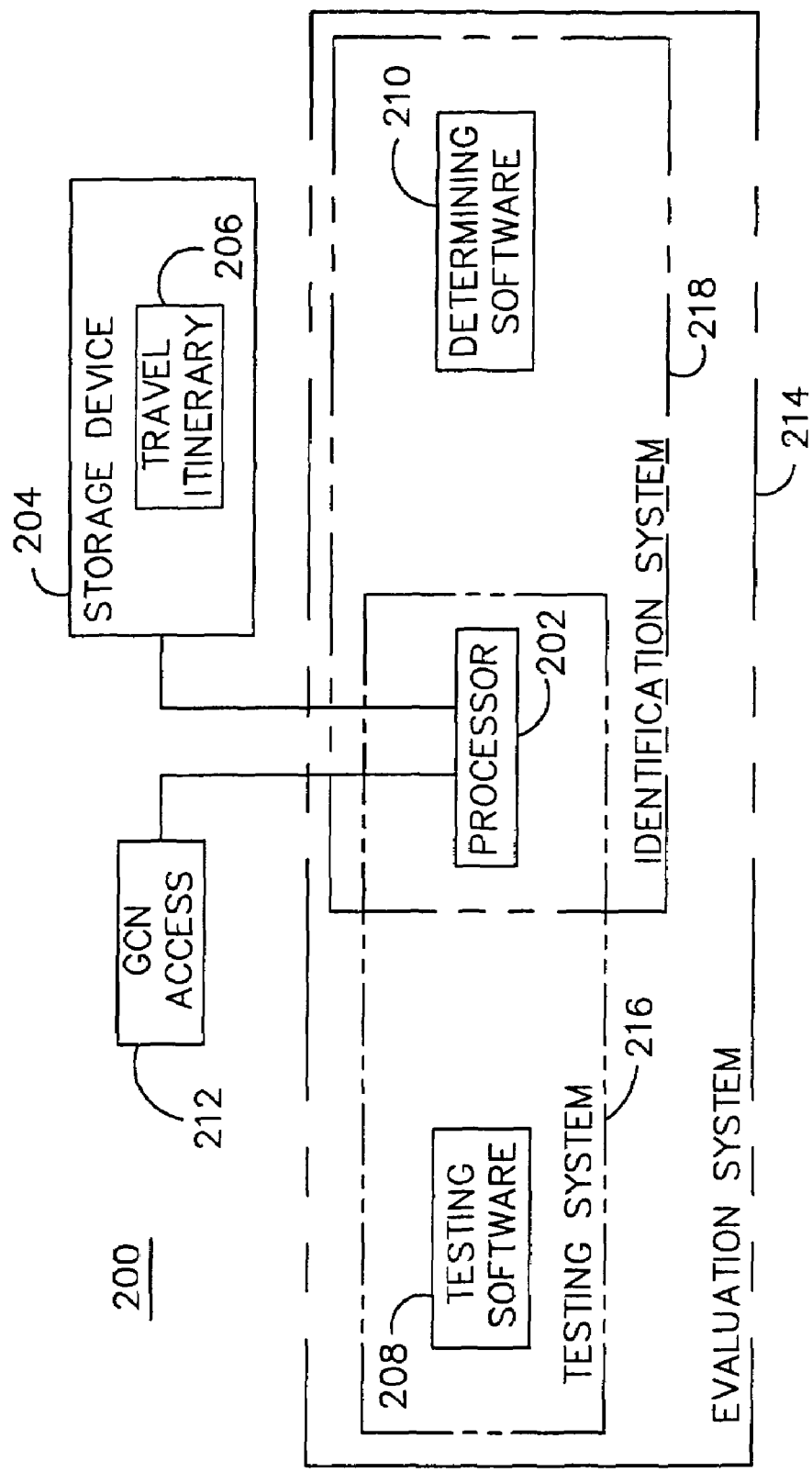
FIG. 2 is a block diagram of a preferred embodiment of the system of the invention illustrating the main components.

Referring next to FIG. 2, a block diagram of a preferred embodiment of the system 200 of the invention illustrates the main components. The travel itinerary 206 is stored in a storage device 204 such as a hard drive or other memory. The processor 202 accesses the travel itinerary 206 via the storage device 204. Testing software 208, operative with the processor 202, applies the level 1 and level 2 tests to the itinerary 206 as shown in Tables 1 and 2 below. A testing system 216 comprises the testing software 208 and the processor 202. Determining software 210, operative with the processor 202 and responsive to the results from the testing software 208, determines the O&D services for the itinerary 206 as shown in Tables 3, 4, and 5 below. An identification system 218 comprises the determining software 210 and the processor 202. An evaluation system 214 comprises the testing 216 and identification 218 systems.

In a preferred embodiment of the invention, the testing software 208 and the determining software 210 are resident in the processor 202. Preferably, the processor 202 is accessible via an optional global computer network (GCN) access 212 such as the Internet.

Figure 3A:
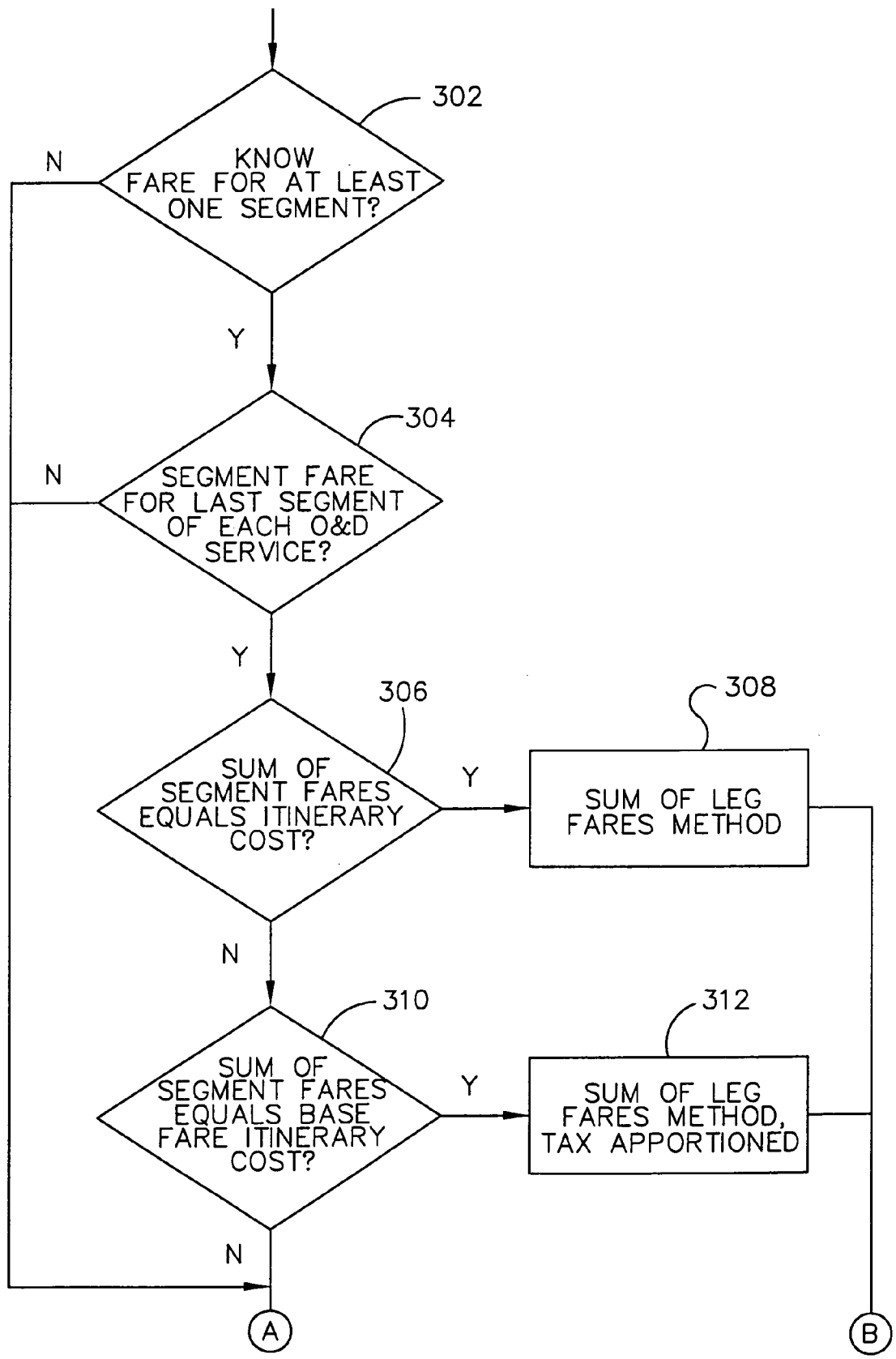
FIGS. 3A and 3B are a flow charts illustrating the main steps of a preferred embodiment of the method of the invention in which O&D costs for a travel itinerary are determined.
Figure 3B:
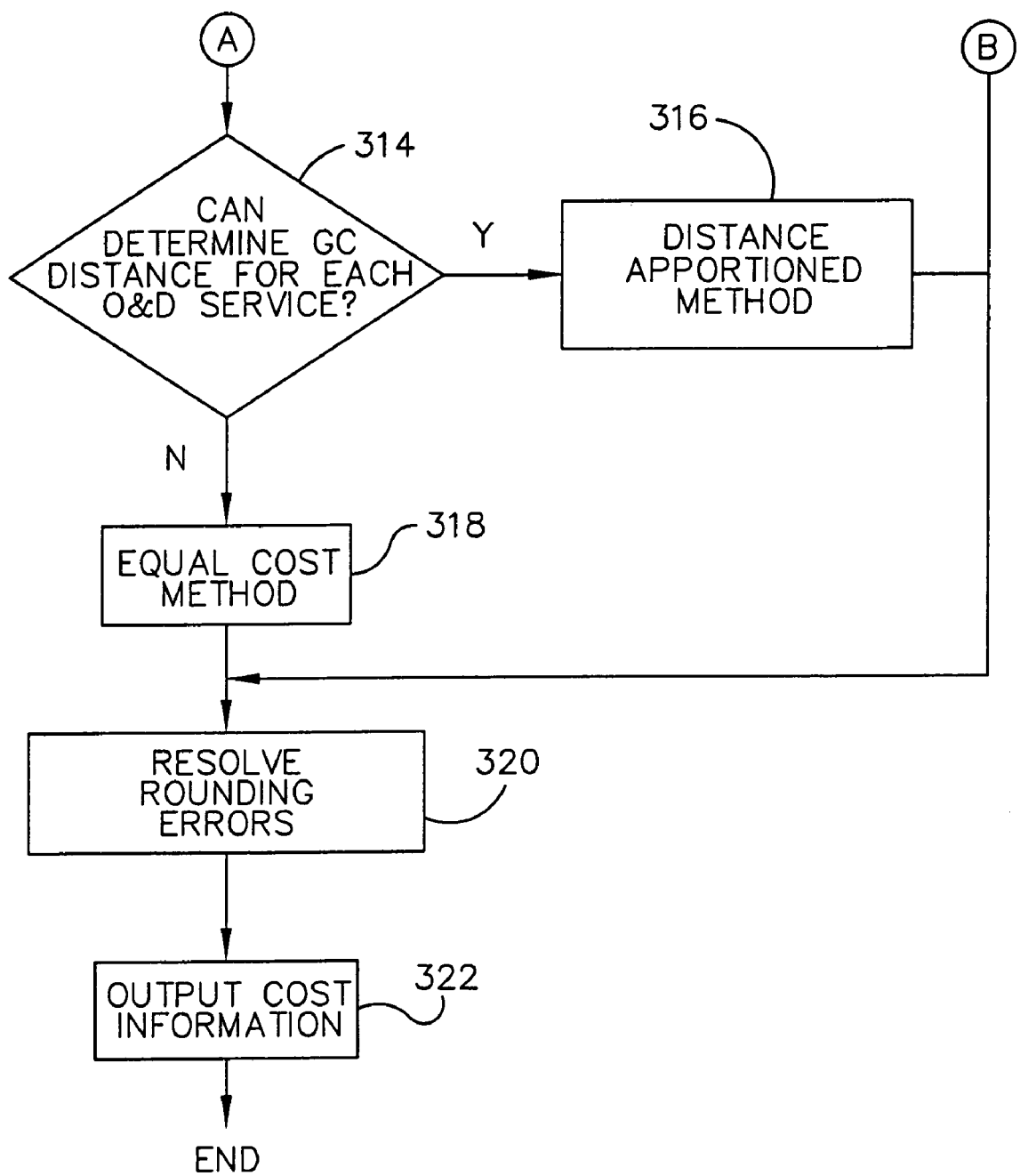

Referring next to FIGS. 3A and 3B, flow charts illustrate the main steps of a preferred embodiment of the method of the invention in which O&D costs for the travel itinerary 206 are determined after the O&D analysis has been applied. The cost method broadly comprises the following steps. First, costs are derived from the itinerary 206. In particular, the cost associated with the entire itinerary 206 is ascertained. The base fare and tax components of the itinerary cost are further derived. Also, the fare associated with one or more segments of the itinerary 206 is derived.

At 302, if the fare for at least one segment is not known, then processing continues at 314 (see below). If the fare for at least one segment is known, then processing continues at 304. At 304, if the segment fare for the last segment of at least one O&D service in the itinerary 206 is unknown, then processing continues at 314. Otherwise, processing continues at 306. At 306, if the sum of the segment fares equals the total itinerary cost, then a sum of leg fares method is used at 308 to determine the costs associated with the determined O&D services. The sum of leg fares method sums the segment fares associated with the itinerary 206 to obtain the determined cost.

However, if the sum of the segment fares does not equal the total itinerary cost, processing continues at 310. At 310, if the sum of the segment fares equals the total base fare itinerary cost, then a sum of leg fares, tax-apportioned method is used at 312 to determine the costs associated with the determined O&D services. The sum of leg fares, tax-apportioned method sums the segment fares associated with the itinerary 206, plus an apportioned amount of the itinerary tax, to obtain the determined cost. The apportioned amount of the itinerary tax can be determined in several ways. In a preferred embodiment, the apportioned amount is determined in several steps. First, an intermediate O&D cost is determined by summing the segment fares for each O&D service. A fraction of the total base fare itinerary cost that each intermediate O&D cost represents is determined. A like fraction of the total itinerary tax cost is added to each respective intermediate O&D cost to arrive at the final O&D cost for the itinerary 206.

If the sum of the segment fares does not equal the total base fare itinerary cost at 310, processing continues at 314. At 314, if a great circle distance for each O&D service can be determined, a distance apportioned method is used at 316 to determine the costs associated with the determined O&D services. The great circle distance is measured from the origin directly to the destination, ignoring any connecting points that may exist for the O&D service. The distance apportioned method is determined in several steps. First, the sum of the O&D service distances are computed and referred to as a total itinerary O&D distance. The fraction that each O&D distance comprises of the total itinerary O&D mileage is also computed. Multiplying the total itinerary cost by the respective O&D distance fractions determines the O&D cost of each O&D service.

If a great circle distance for each O&D service cannot be determined at 314, then an equal cost method is used at 318 to determine the costs associated with the determined O&D services. The equal cost method comprises the steps of counting the number of O&D services for the itinerary 206 and dividing the total itinerary cost by the number of O&D services. The resulting amount is the cost of each O&D service.

After the costs have been determined using the appropriate method at 308, 312, 316, or 318, any rounding errors are detected and resolved at 320. In a preferred embodiment, the rounding errors are detected and resolved in the following manner. First, the sum of the calculated O&D costs are compared with the derived, total itinerary cost. If there is no difference, then rounding errors do not exist in this determination.

However, if there is a difference, it would be due to rounding the O&D costs. If the sum of the O&D costs is higher than the total itinerary cost, one currency unit (one penny, in the case of United States dollar-denominated costs) is subtracted from the lowest-cost O&D service. This step is repeated for the next lowest-cost O&D service, if needed, and then repeated until the difference between the sum of the O&D costs and the total itinerary cost disappears. If the sum of the O&D costs is lower than the total itinerary cost, a currency unit is added to the highest-cost O&D services until the difference disappears. At most, an adjustment is made to one currency unit less than the total number of O&D services.

After the rounding errors have been detected and resolved at 320, the O&D costs for the travel itinerary 206 and the method of calculation are output at 322 and processing terminates.

In operation, the system 200 of the invention determines the O&D services of the itinerary 206 if the itinerary 206 meets certain assumptions at 104. One assumption is that no segment begins and ends at the same place; that is, no departure of any segment is equivalent to an arrival of the same segment. Given the assumption that O&D measures a person's intent to move from one place to another, it would be illogical to consider a segment that creates no net spatial displacement of the passenger. Any such segment would be either a data error or a service taken for a purpose other than transportation, e.g., a pleasure cruise or a sightseeing tour.

Another assumption at 104 is that the itinerary 206 is ordered chronologically. The invention depends heavily on the order in which trip events occur. If the input itinerary 206 is out of chronological sequence, the results derived from the invention will almost certainly be incorrect. In some cases, the itinerary 206 in chronological order might seem to be out of sequence, based on the local times of the departures and arrivals. The results of the invention are not affected by apparent anomalies introduced by segments that cross time zones or the International Date Line.

Another assumption at 104 is that itinerary data, when present, is correct. The invention allows for many fields to be blank or unknown. However, data that is present is assumed to be true and free of typographical and/or content-based errors. Since some travel-related data tends to have a high error rate, the invention de-emphasizes fields known to be among the less reliable. Depending on the particular itinerary, incorrect data elements might cause the invention to generate an incorrect result.

Yet another assumption at 104 is that the itinerary 206 is not null and does not consist solely of surface segments. The invention only deals with itineraries that involve transportation of a passenger from one place to another.

Yet another assumption at 104 is that the itinerary 206 contains no duplicate or other extraneous transportation segments. The itinerary 206 may contain more than one segment for a portion of the trip. It may also contain a segment that falsely appears to be for specific transportation. This false appearance may happen in order to accommodate various contingent travel requests: waitlisting a flight for a class of service change, waitlisting for an earlier or later flight, double-booking several flights at different times of the day, or for administrative needs. The invention does not consider the segment status code. It does assume that every segment in the itinerary 206 is to be analyzed. The invention will return an incorrect result if the itinerary 206 is ambiguous or if it contains duplicate or spurious segments.

The invention expects to process the itinerary 206 after explicit ARNK (surface) segments have been removed. When necessary, as a first step, the O&D process will scan the itinerary 206 to detect and remove ARNKs, and then consecutively renumber the remaining segments.

In a preferred embodiment, a computer-implemented system implements a program for determining one or more O&D services for the travel itinerary 206. The travel itinerary 206 has segment data stored in a computing system which has the processor 202 operating according to an accompanying program instruction set. The system 200 comprises an input system which inputs itinerary data derived from the itinerary 206 into the processor 202. The system 200 further comprises the evaluation system 214 which determines one or more O&D services for the itinerary 206 by applying a multi-level test to the itinerary data. The system 200 further comprises an output system which outputs the O&D services from the tested itinerary data.

The corresponding method for the embodiment of this system 200 electronically provides the input, evaluation 214, and output systems for determining one or more O&D services for the travel itinerary 206.

The input system, evaluation system 214, and output system can be personal computers or application servers and can be selectively interconnected via the GCN 212. Preferably, the functionality of one or more of the systems may be shared partially or entirely by another system. In a preferred embodiment, the input, evaluation 214, and output systems are located on the same computing device.

In another preferred embodiment, the system 200 comprises the multi-level testing system 216 which applies a multi-level test to the itinerary data. The system 200 also comprises the identification system 218 which identifies the O&D services from the tested itinerary data.

The multi-level testing 216 and identification 218 systems can be personal computers or application servers and can be selectively interconnected via a global computer network such as the Internet. Preferably, the functionality of one or both of the systems may be shared partially or entirely by the other system. In a preferred embodiment, the multi-level testing 216 and identification 218 systems are located on the same computing device.

The invention applies a number of tests to the itinerary 206 in order to determine the STPs and connecting points (CPs), thereby determining O&D services for the itinerary 206.

There are two types of tests: level 1 and level 2. A level 1 test can produce a result that by itself will determine the STP. A level 2 test, when applicable, will produce a result that must be combined with results from other tests in order to establish the STP.

The result of an inapplicable level 2 test must be ignored when deciding if a destination is the STP or the CP. Failure to ignore the result of an inapplicable level 2 test subverts the feature of the invention that favors more reliable data over those that are less reliable. The result of an inapplicable level 2 test may give a contradictory indication of the STP or the CP status for a given destination. The tables below tell when a given level 2 test applies.

The tests have been given an alphanumeric Test ID, a description, a notational formula, and a result set.

The Notational Formulas were developed in the course of creating the invention. Most of the tests are expressed in notation as single functions, combinations of functions, relationships between functions, or combinations of relationships between functions. The functions operate on points or segments. The "segments" might be real (they actually occur in the itinerary 206) or constructed (they tie points together in the itinerary 206 that do not belong to the same segment).

The Notational Formulas use the following symbols and their associated meaning.

TABLE 1

Level 1 Tests

| Test ID | Test Description | Notational Formula | Result Set |
|---|---|---|---|
| CO1 | Is the current segment the final segment of the itinerary? | Last $(O_nD_n)$? | Y (this is the final segment) N (this is not the final segment) |
| E1 | Is the relationship between the current destination and the next origin both "Surface" and "Non-coterminous"? | $D_n <> O_{n+1}$ and not $(D_n \sim O_{n+1})$? | Y (this is a Non-coterminous Surface) N (there is trip continuity) (If $O_{n+1}$ does not exist, the result is "N".) |
| E2 | Is the next destination the same as the current origin? | $O_n == D_{n+1}$ or $O_n \sim D_{n+1}$? | Y (the next segment is a Return) N (the next segment is not a Return) (If $D_{n+1}$ does not exist, the result is "N".) |

= means the same as; equal to
~ means is coterminous with; is approximately equal to
== means is exactly equivalent to
$_n$ means "of" or "belonging to" the nth segment
$O_n$ means the origin of the nth segment
$D_n$ means the destination of the nth segment
$A_n$ means the carrier of the nth segment
$O_nD_n$ means the nth segment as identified by its begin and end nodes
< means is less than
> means is greater than
<> means is not equal to Each level 1 test, by itself, can return a value that will flag a destination as the STP. A positive ("Y") result from any level 1 test does mark the destination of that segment as the STP. If every level 1 test returns a negative ("N") result for a given segment, then level 2 testing must be performed on that segment.

Nominally, each applicable test is applied to each travel segment. However, since many tests compare two or more segments, not every test will return a meaningful result for every segment. For level 1 tests, in practice, the $CO_1$ test is applied to every segment. The E1 and E2 tests compare aspects of the current segment to aspects of the next segment. When there is no "next" segment, E1 and E2 are not meaningful, and a default result of "N" is declared.

Referring to Table 1, the destination of the segment is marked as the STP if the current segment is the final segment of the itinerary 206, if the current destination and the next origin are both non-coterminous and non-equivalent, or if the next destination is equivalent to the current origin.

After the itinerary 206 has been separated into segment groups, using the level 1 test results, any remaining null STFs are resolved by applying the appropriate series of level 2 tests.

The tests are applied in the order shown in Table 2. However, not every test is applicable to every situation. Some tests will be skipped, depending on the results of preceding tests. Also, since most tests involve comparisons between two or three segments, not every test is applied to every segment.

TABLE 2

Level 2 Tests

| Test ID | Test Description | Notational Formula | Result Set |
|---|---|---|---|
| SG1 | How many segments are in the current segment group? | no notational formula | a positive integer |
| E3 | Is the destination of the next segment the same as or coterminous with the origin of the previous segment? (Alternately, is this the middle segment of a Triangle Trip?) | $D_{n+1} = O_{n-1}$ or $D_{n+1} \sim O_{n-1}$ ? | Y (this is the middle segment of a triangle pattern) N (this is not the middle segment of a triangle pattern) (If either $D_{n+1}$ or $O_{n-1}$ do not exist, the result is "N".) |
| E4 | Is the current segment destination the same as or coterminous with the origin from three segments ago? (Alternately, is this the final segment of a Diamond Trip?) | $D_n = O_{n-3}$ or $D_n \sim O_{n-3}$ ? | Y (this is the final segment of a diamond pattern) N (this is not the final segment of a diamond pattern) (If $O_{n-3}$ does not exist, the result is "N".) |
| Ex | Is the current segment destination the same as or coterminous with the origin from "x − 1" segments ago? (Alternately, is this the final segment of a closed polygonal trip?) | $D_n = O_{n-x-1}$ or $D_n \sim O_{n-x-1}$ ? | Y (this is the final segment of a closed polygon pattern) N (this is not the final segment of a closed polygon pattern) (If $O_{n-x-1}$ does not exist, the result is "N".) |
| DI2 | Are all of the following segments Domestic: The current, the immediately preceding, and the immediately following? (As with other tests, the results of this test apply to the current segment only.) | Domestic $(O_{n-1}D_{n-1})$ and Domestic $(O_nD_n)$ and Domestic $(O_{n+1}D_{n+1})$ ? (See DI1 for derivation of Domestic.) (If either segment $O_{n-1}D_{n-1}$ or $O_{n+1}D_{n+1}$ does not exist, treat the missing segments as "Domestic", then apply the DI2 test.). | Y (or D) (the current segment is not itself International and is not proximate to an International segment) N (or I) (the current segment is International or is proximate to an International segment) |
| DI1 | Does the current segment belong to a single country group? (Alternately, is this a | CountryGroup $(O_n)$ = CountryGroup $(D_n)$ ? | Y (or D) (Domestic, one country group) N (or I) (International, different country groups) |

TABLE 2-continued

Level 2 Tests

| Test ID | Test Description | Notational Formula | Result Set |
|---|---|---|---|
| | domestic flight?) | | |
| DI4 | Does the current destination belong to the same country group as the origin of the previous segment? | CountryGroup $(D_n)$ = CountryGroup $(O_{n-1})$ ? | Y (same country group) N (different country group) (If $O_{n-1}$ does not exist, the result is "Y".) |
| DI5 | Does the current destination belong to the same country group as the origin of 2 segments ago? | CountryGroup $(D_n)$ = CountryGroup $(O_{n-2})$ ? | Y (same country group) N (different country group) (If $O_{-2}$ does not exist, the result is "Y".) |
| DI6 | Does the current destination belong to the same country group as the origin of 3 segments ago? | CountryGroup $(D_n)$ = CountryGroup $(O_{n-3})$ ? | Y (same country group) N (different country group) (If $O_{n-3}$ does not exist, the result is "Y".) |
| DIx | Does the current destination belong to the same country group as the origin of "n − x + 3" segments ago? | CountryGroup $(D_n)$ = CountryGroup $(O_{n-x+3})$ ? | Y (same country group) N (different country group) (If $O_{n-x+3}$ does not exist, the result is "Y".) |
| T10 | How much time is spent at the current destination? | ElapsedTime $(D_n O_{n+1})$ ? | This test might return an exact time, a range of times, or "Unknown." (If $O_{n+1}$ does not exist, the result is "UN".) |
| T11 | Is the amount of time spent at the current destination above the threshold set for connections of this type ("D" or "I" as applicable, from test DI2), is it at or below the threshold, or is it unknown? | Stopover Threshold (ElapsedTime $(D_n O_{n+1})$) ? (Uses results of tests DI2 and T10, plus a "threshold" parameter as set by the user.) | Y (It is above the threshold.) N (It is not above the threshold.) UN (U) (Unknown due to insufficient data.) |
| CA1 | Is the carrier of the current segment the same as the carrier of the next segment? | Carrier $(O_n D_n)$ = Carrier $(O_{n+1} D_{n+1})$ ? Alternate notation: $A_n = A_{n+1}$? | Y (they are the same) N (they are not the same) (If $O_{n+1} D_{n+1}$ does not exist, or if either carrier is unknown, make the result "N".) |
| T05 | Is there at least an overnight spent at the current destination? (Alternately, does the departure from | Date$(D_n)$ < Date$(O_{n+1})$ ? | Y (there is at least one overnight) N (there is no overnight) UN (U) (unknown because one or both dates are unknown) (If $O_{n+1}$ does not exist, the result is |
| | the next origin happen on a later date than the arrival at the current destination?) | | "UN".) |
| TR1 | What is the relationship between the time spent at the current destination and the time spent at the next destination? | Relationship between ElapsedTime $(D_n O_{n+1})$ and ElapsedTime $(D_{n+1} O_{n+2})$ | GT (>) LT (<) EQ (=) UN (U) (Unknown because one or both times are unknown) (If either or both forward segments do not exist, the result is "UN".) |
| DS0 | What is the Great Circle distance between the origin and destination of the current segment? | Distance $(O_n D_n)$ | A number between zero and approximately 20,000 km. If $O_n == D_n$, the result will be zero. (This result used by test DS1.) |
| DS1 | Is the distance from the destination of the current segment to the origin of the prior segment less than the distance of the current segment AND less than the distance of the prior segment? | Distance $(D_n O_{n-1})$ < Distance $(O_n D_n)$ and Distance $(D_n O_{n-1})$ < Distance $(O_{n-1} D_{n-1})$ ? | Y $((D_n O_{n-1})$ is the shortest) N $((D_n O_{n-1})$ is not the shortest, or $(D_n O_{n-1})$ cannot definitely be established as the shortest) (If the relative distances cannot be derived, the result is "N".) |
| X03 | Is the current destination marked as a connection? | Connect$(D_n)$ ? | Y (X) (this is a connection) N (O or blank) (this is not a connection) |

Level 2 tests are applied, in the order shown in Table 2, only until the STF for the segment has been definitively set to either "yes" or "no." Setting of the STF is shown in Tables 3, 4, and 5 (see below). Setting the STF to "yes" means that the current destination is the STP. Setting the STF to "no" means that the current destination is not the STP, and is the CP. Once a STF has been set to either "yes" or "no," no further level 2 tests are performed on that segment. This is part of the feature of the invention that prevents less-indicative data to affect the outcome of the analysis when data known to be more generally indicative is available. Note that Table 2 does not show when an STF is set. The "Result Set" column in Table 2 indicates the results of the specific test. Tables 3, 4, and 5 use the results of the specific test to determine how the STF should be set.

One of the factors that the present invention considers is a comparison of "great circle" mileage between various points in the itinerary 206 (tests DS0 and DS1). The most straightforward way to derive these comparisons is to calculate and compare the exact mileages themselves. The resources to do this are commonly available, either in the public domain or for sale by private companies. However, the process uses comparisons among mileages (longer than, shorter than), not the exact mileages themselves. Lacking the ability to calculate mileages, the user can either provide the comparisons by other means, or use the default "no" value of the DS1 test.

For groups comprised of one or two segments, the multi-level test of the system 200 includes applying the level 1 tests of Table 1 and then applying the level 2 tests of Table 3 below. Table 3 illustrates the subset of the level 2 tests used to determine O&D services for one- and two-segment groups. The depth column refers to the number of level 2 tests that have been performed on the segments. The depth number groups the test into logical units, skipping over unused tests for the number of segments.

TABLE 3

One- and Two-Segment Group Tests

| Depth | Test ID | Seg Grp # | Seg # | Result | $D_n$ STF | Significance |
|---|---|---|---|---|---|---|
| 1 | SG1 | 1 | 1 | 1 | Y | This is a one-segment segment group. Processing ends for this segment group. |
| 1 | SG1 | 2 | 1 | 1 | null | Go to Segment 1 test DI2. |
| 1 | SG1 | 2 | 2 | 2 | Y | This is a two-segment segment group. Apply the two-segment test sequence. Next action depends on result of Segment 1 DI2 test. |
| 2 | E3 | 2 | 1, 2 | n/a | null, Y | This test is not applicable to a two-segment segment group. |
| 2 | E4 | 2 | 1, 2 | n/a | null, Y | This test is not applicable to a two-segment segment group. |
| 2 | DI2 | 2 | 1 | D | null | Sets the T11 threshold value. Go to Segment 1 test T10. |
| 2 | DI2 | 2 | 1 | I | null | Sets the T11 threshold value. Go to Segment 2 test DI4. |
| 2 | DI2 | 2 | 2 | n/a | Y | Not applicable to this segment. |
| 3 | DI1 | 2 | 1, 2 | n/a | null, Y | This test is not applicable to a two-segment segment group. |
| 3 | DI4 | 2 | 1 | n/a | * | *If Seg 2 DI4 = "Y" then $D_1$ STF = "Y" and processing stops. If Seg 2 DI4 = "N" then $D_1$ STF remains null, and continue with test T10. |
| 3 | DI4 | 2 | 2 | Y or N | Y | The result of this test affects $D_1$. See Segment 1 test DI4. |
| 4 | DI5 | 2 | 1, 2 | n/a | null, Y | This test is not applicable to a two-segment segment group. |
| 4 | DI6 | 2 | 1, 2 | n/a | null, Y | This test is not applicable to a two-segment segment group. |
| 5 | T10 | 2 | 1 | An elapsed time, a range of elapsed times, or "Unknown." | null | Used by test T11. Go to T11. |
| 5 | T10 | 2 | 2 | n/a | Y | Not applicable to this segment. |
| 5 | T11 | 2 | 1 | Y | Y | The elapsed time is known to be greater than the threshold. $D_1$ is a service termination point. End processing. |
| 5 | T11 | 2 | 1 | N | N | The elapsed time is known to be at or less than the threshold. $D_1$ is a connecting point. End processing. |
| 5 | T11 | 2 | 1 | UN | null | The elapsed time at $D_1$ is unknown. If DI2 = "D", go to test CA1. If DI2 = "I", go to test DS0 (at depth 7) |
| 5 | T11 | 2 | 2 | n/a | Y | Not applicable to this segment. |
| 6 | CA1 | 2 | 1 | Y | null | Continue with test T05. |
| 6 | CA1 | 2 | 1 | N | Y | The carriers are different, or one or more carriers is unknown. $D_1$ is a service termination point. End processing. |
| 6 | CA1 | 2 | 2 | n/a | Y | Not applicable to this segment. |
| 7 | T05 | 2 | 1 | Y | Y | The elapsed time is at least overnight. $D_1$ is a service termination point. End processing. |
| 7 | T05 | 2 | 1 | N or UN | null | Continue with test DS0. |
| 7 | T05 | 2 | 2 | n/a | Y | Not applicable to this segment. |
| 8 | TR1 | 2 | 1, 2 | n/a | null, Y | This test is not applicable to a two-segment segment group. |
| 8 | DS0 | 2 | 1 | A non-negative distance; or "unknown". | null | This result is used by Segment 2 test DS1. Go to test DS1. |
| 8 | DS0 | 2 | 2 | A non-negative distance; or "unknown". | Y | This result is used by Segment 2 test DS1. Go to test DS1. |
| 8 | DS0 | 2 | * | A non-negative distance; or "unknown". | * | *-The distance between the Segment 2 end-point ($D_2$) and the Segment 1 begin-point ($O_1$) is used by test DS1. |
| 8 | DS1 | 2 | 1 | n/a | Y or N | DS1 test not applicable to this segment. The status of the $D_1$ STF is determined by the Segment 2 DS1 test. End processing after |

TABLE 3-continued

One- and Two-Segment Group Tests

| Depth | Test ID | Seg Grp # | Seg # | Result | $D_n$ STF | Significance |
|---|---|---|---|---|---|---|
| 8 | DS1 | 2 | 2 | Y ($D_nO_{n-1}$ is the shortest) N ($D_nO_{n-1}$ is either not the shortest, or cannot definitely be identified as the shortest) (If the relative distances cannot be derived, the result is "N".) | Y | the $D_1$ STF has been set by the Segment 2 DS1 test. If the result of this test is "Y" then set the $D_1$ STF to "Y", otherwise set to "N". End of processing. |
| 9 | X03 | 2 | 1, 2 | n/a | n/a | This test is not applicable to a two-segment segment group. |

Referring to Tables 2 and 3, test SG1 determines the number of segments in the segment group. If there is exactly one segment in the segment group, the STF for that segment was set to positive ("Y") by one of the level 1 tests, and processing ends. If there are exactly two segments in the segment group, the STF for segment 2 earlier was set to positive ("Y") by one of the Level 1 tests, and processing continues on segments 1 and 2 to determine the status of segment 1. Tests E3 and E4 do not apply to two-segment segment groups. Processing continues with test DI2.

Test DI2 is applied only to segment 1. If segment 1 is not itself international and is not proximate to an international segment (test DI2), then the T11 threshold for this segment is set to the "domestic" value, and processing continues with test T10. Otherwise, the first segment is international or is proximate to an international segment, and the T11 threshold for this segment is set to the "international" value, and processing continues with test DI4. Test DI1 is not applicable to a two-segment segment group.

Test DI4 is applied only to segment 2, with reference to segment 1. If the destination of the second segment is from the same country group as the origin of the first segment (test DI4), then the first segment STF is set to "Y" and processing stops. Otherwise, processing continues with test T10. Tests DI5 and DI6 are not applicable to a two-segment segment group.

Test T10 is applied only to segment 1, with reference to segment 2. The time spent at the destination of the first segment is determined (test T10), and then is compared to the applicable T11 threshold for segment 1. The T11 threshold values are set by the user, and are based on travel industry standards. In June 2000, the typical "domestic" threshold value would be 4 hours and a typical "international" value would be a user-chosen number from 8 to 24 hours.

If the time spent at the destination of the first segment (test T10) is greater than the segment 1 T11 threshold, then the first segment STF is set to "Y" and processing stops. If the time spent at the destination of the first segment (test T10) is less than or equal to the segment 1 T11 threshold, then the first segment STF is set to "N", indicating the first segment destination is the CP, and processing stops. If the relationship between the time spent at the destination of the first segment and the segment 1 T11 threshold is unknown, and if segment 1 is "domestic" (test DI2), processing continues with test CA1. Otherwise, processing continues with test DS0.

Test CA1 is applied only to segment 1, with reference to segment 2. If the carrier of segment 1 is not the same as that of segment 2, and if the carriers of both segments are known (test CA1), then the first segment STF is set to "Y" and processing stops. Otherwise, processing continues with test T05. Test TR1 is not applicable to a two-segment segment group.

Test T05 is applied only to segment 1, with reference to segment 2. If there is at least an overnight spent at the first destination (test T05), then the first segment STF is set to "Y" and processing stops. Otherwise, processing continues with test DS0.

Test DS0 is applied to both segments 1 and 2, and to an imaginary third segment beginning at the destination of segment 2 and ending at the origin of segment 1. Processing then continues with test DS1, which is applied only to segment 2, with reference to the three DS0 distances. If the distance from the destination of the second segment to the origin of the first segment is shorter than both the distance of the first segment and the distance of the second segment, then the first segment STF is set to "Y" and processing stops. If the distance from the destination of the second segment to the origin of the first segment is not shorter than both the distance of the first segment and the distance of the second segment, or if the relationship cannot be determined, then the first segment STF is set to "N", indicating the first segment destination is the CP, and processing stops. The final test, X03, does not apply to a two-segment segment group.

Generally with regard to FIGS. 4–11, refer to the notational explanation immediately preceding Table 1. A rectangle indicates a location on the itinerary 206. The location can be a segment origin, destination, or both. For example, in FIG. 4, the rectangle containing $D_1O_2$ means that the location is both the destination of segment 1 and the origin of segment 2. Further, contiguous rectangles indicate that the traveler visited the same location at different times. For example, in FIG. 6, $O_1$ indicates the origin of the trip and $D_3$ indicates the destination of the trip. Since the boxes containing $O_1$ and $D_3$ are contiguous, the origin and destination are the same (a round trip). The arrows indicate travel from a segment origin to a segment destination. An optional label next to the arrows indicates a specific carrier used for the travel.

Figure 4:
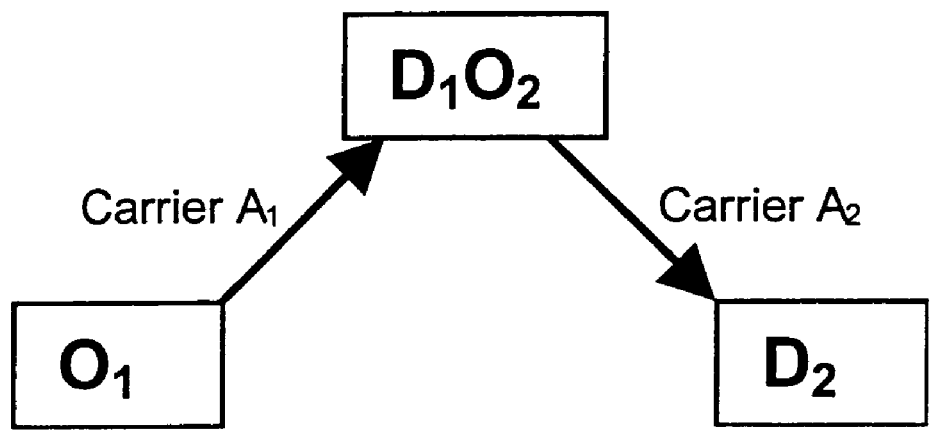
FIG. 4 is a block diagram illustrating a two-segment group according to the invention.

Referring next to FIG. 4, an example of a two-segment group is shown. Starting at an origin $O_1$, a traveler arrives at $D_1O_2$ via carrier $A_1$. Subsequently, the traveler departs $D_1O_2$ and arrives at $D_2$ via carrier $A_2$. If none of the level 1 tests return a "yes" result for the first segment ($O_1D_1$), and one of the level 1 tests returns a "yes" result for the second segment ($O_2D_2$), the resulting segment group can be represented as in FIG. 4. At this point, the sequence of level 2 tests is applied as indicated in Table 3 to determine the status of point $D_1O_2$: Is it the CP or the STP? If it is the CP, then the O&D Pair is $O_1D_2$ with a connection at point $D_1O_2$, which now can be represented as point $C_1$, using carriers $A_1$ and then $A_2$. If $D_1O_2$ is proved to be the STP, then this segment group has two O&D Pairs: $O_1D_1$ using carrier $A_1$, and $O_2D_2$ using carrier $A_2$. There are no CPs in this case.

For groups comprised of three segments, the multi-level test of the system 200 includes applying the level 1 tests of Table 1 and then applying the level 2 tests of Table 4 below. Table 4 illustrates the subset of the level 2 tests used to determine O&D services for three-segment groups.

TABLE 4

Three-Segment Group Tests

| Depth | Test ID | Seg # | Result | $D_n$ STF | Significance |
|---|---|---|---|---|---|
| 1 | SG1 | 1 | 1 | null | Go to test DI2. |
| 1 | SG1 | 2 | 2 | null | Go to test E3 to determine the geometry of the segment group. |
| 1 | SG1 | 3 | 3 | Y | Next action depends on result of Segments 1&2 DI2 tests. Proceed to Depth 3. |
| 2 | E3 | 1 | n/a | * | Not applicable to this segment. *Segment 2 E3 test affects $D_1$ STF. |
| 2 | E3 | 2 | Y (a closed triangle) | * | At least one of $D_1$ and $D_2$ is the STP. Continue with test DI2. |
| 2 | E3 | 2 | N ($O_1$ and $D_3$ are not the same) | null | Continue with test DI2. |
| 2 | E3 | 3 | n/a | Y | Not applicable to this segment. |
| 3 | E4 | 1, 2, 3 | n/a | n/a | This test is not applicable to a 3-segment segment group. |
| 3 | DI2 | 1, 2 | D, I (1st segment is "D", 2nd segment is "I") | null, null | Sets the T11 threshold value. This result cannot occur if segment 2 E3 test is "Y". Go to test T10. |
| 3 | DI2 | 1, 2 | I, D | n/a | Due to the definition of test DI2, this result cannot occur. |
| 3 | DI2 | 1, 2 | D, D | * | Sets the T11 threshold value. Go to test T10. *No new information is added about the $D_1$ and $D_2$ STFs. |
| 3 | DI2 | 1, 2 | I, I | * | Sets the T11 threshold value. Go to test DI1. *No new information is added about the $D_1$ and $D_2$ STFs. |
| 3 | DI2 | 3 | n/a | Y | Not applicable to this segment. If the DI2 test for segments 1 & 2 is "I, I", go to test DI1. Otherwise, go to test T10. |
| 4 | DI1 | 1, 2, 3 | any | any | The DI1 test is only useful when the DI2 test for segments 1 & 2 is "I, I". If the DI2 test has any other result, skip this test and continue with test T10. |
| 4 | DI1 | 1, 2, 3 | D, I, D | * | This result can only occur when the segment 2 E3 test is "N". *No new info is added for $D_1$ and $D_2$ STFs. Go to T10. |
| 4 | DI1 | 1, 2, 3 | I, D, I | * | If segment 2 E3 is "Y", continue with T10. If segment 2 E3 is "N", continue with segment 3 test DI5. |
| 4 | DI1 | 1, 2, 3 | D, I, I | null, Y, Y | If segment 2 E3 is "Y", $D_2$ is the STP and $D_1$ remains null. Continue with T10. |
| 4 | DI1 | 1, 2, 3 | D, I, I | * | If segment 2 E3 is "N", no new STFs can be set. Continue with segment 3 test DI4. |
| 4 | DI1 | 1, 2, 3 | I, I, D | * | If segment 2 E3 is "Y", continue with T10. If segment 2 E3 is "N", continue with segment 2 test DI4. |
| 4 | DI1 | 1, 2, 3 | D, D, I | n/a | This is an impossible result, assuming DI2 is "I, I". To get this DI1 result, the result of DI2 would have been "D, I". |
| 4 | DI1 | 1, 2, 3 | I, D, D | * | This result can only occur when the segment 2 E3 test is "N". *No new info is added for $D_1$ and $D_2$ STFs. Go to T10. |
| 4 | DI1 | 1, 2, 3 | I, I, I | * | If segment 2 E3 is "Y", continue with T10. If segment 2 E3 is "N", continue with segment 2 & 3 test DI4. |
| 4 | DI1 | 1, 2, 3 | D, D, D | * | This result indicates that the DI2 test for segments 1 & 2 is "D, D". The DI1 test is inapplicable. Continue with test T10. |
| 5 | DI4 | 1 | n/a | * | Not applicable to this segment. *The results of the DI4 test on segments 2 and/or 3 can determine the status of the $D_1$ STF. |
| 5 | DI4 | 2, 3 | any | any | This test should only be used under the circumstances noted by test DI1. The purpose of the DI1, DI4, and DI5 tests is to determine movement among country groups. |
| 5 | DI4 | 2 | Y (same country group) | * | Movement from country group (CG) 1 to CG 2 and back to CG 1 has been established by a DI4 "Y" result in combination with the DI1 segment 1 & 2 "I, I" results. The $D_1$ STF is "Y". Assuming segment 3 DI1 = "D", or if segment 3 DI1 = "I" and segment 3 DI4 = "N", the status of the $D_2$ STF will be determined by subsequent tests. Go to test T10 for segments 1 & 2. |
| 5 | DI4 | 2 | N (different country group) | * | The first segment of the segment group goes from CG 1 to CG 2. The second segment goes to CG 3. If segment 3 DI1 = "D", then the third segment remains in CG 3. $D_1$ and $D_2$ STFs will be determined by the next tests. Go to test T10. If segment 3 DI1 = "I", and if segment 3 DI4 = "Y", |

TABLE 4-continued

Three-Segment Group Tests

| Depth | Test ID | Seg # | Result | $D_n$ STF | Significance |
|---|---|---|---|---|---|
| | | | | | then segment 3 returns to CG 2. $D_2$ is the STP, $D_1$ STF is determined by subsequent tests. Go to test T10 for segments 1 & 2. |
| 5 | DI4 | 3 | Y (same country group) | * | Assuming segment 2 & 3 DI1 = "II", the third segment returns to the CG of $D_1$. $D_2$ is the STP. If segment 1 DI1 = "I" and segment 2 DI4 = "Y", then $D_1$ is also the STP, and processing ends. If segment 2 DI4 = "N", then $D_1$ STF is determined by subsequent tests. Go to test T10 for segments 1 & 2. |
| 5 | DI4 | 3 | N (different country group) | any | Assuming segments ½/3 DI1 = "DII", then both $D_1$ and $D_2$ STFs will be set by subsequent tests. Go to test T10. Assuming segments ½/3 DI1 = "III", and segment 2 DI4 = "N", then segment 3 test DI5 is used next. If segments 1/2/3 DI1 = "III", and segment 2 DI4 = "Y", this situation is covered above. See segment 2 DI4 test, "Y" condition. |
| 6 | DI5 | 1, 2 | n/a | * | This test does not apply to segments 1 or 2. |
| 6 | DI5 | 3 | any | any | The DI5 test is only used with these results: segment 2 E3 = "N" and segment 1 & 2 DI2 = "II" and (segment ½/3 DI1 = "IDI" or (segment ½/3 DI1 = "III" and segment 2 & 3 DI4 = "NN" ) ) |
| 6 | DI5 | 3 | Y (same country group) | Y | $D_1$ and $D_2$ cannot both be connecting points. Continue with segment 1 & 2 test T10. |
| 6 | DI5 | 3 | N (different country group) | Y | Nothing new is known about $D_1$ and $D_2$. Continue with segment 1 & 2 test T10. |
| 7 | DI6 | 1, 2, 3 | n/a | n/a | This test is not applicable to a 3-segment segment group. |
| 7 | T10 | 1, 2 | An elapsed time, a range of elapsed times, or "Unknown". | * | Results used by test T11. Go to T11. |
| 7 | T10 | 3 | n/a | Y | Not applicable to this segment. |
| 7 | T11 | 1, 2 | Y, Y | Y, Y | $D_1$ and $D_2$ both above the threshold. Both are STPs. End processing. |
| 7 | T11 | 1, 2 | Y, N | Y, * | $D_1$ is above the threshold and is the STP. Unless earlier tests have determined that $D_2$ also must be the STP, $O_2D_2$ and $O_3D_3$ now form a 2-segment group. Go to the beginning of the 2-segment segment group logic. |
| 7 | T11 | 1, 2 | Y, UN | Y, * | Same as case T11 = "YN". |
| 7 | T11 | 1, 2 | N, Y | *, Y | $D_2$ is above the threshold and is the STP. Unless earlier tests have determined that $D_1$ also must be the STP, $O_1D_1$ and $O_2D_2$ now form a 2-segment segment group. Go to the beginning of the 2-segment segment group logic. |
| 7 | T11 | 1, 2 | N, N | N, N | Unless earlier tests have determined that both $D_1$ and $D_2$ cannot be connecting points, both are connecting points, and processing ends. |
| 7 | T11 | 1, 2 | N, N | Y, N or N, Y | If earlier tests have definitely established that $D_1$ or $D_2$ is the STP, then the remaining destination is a connecting point. Processing ends. |
| 7 | T11 | 1, 2 | N, N | Y, N or N, Y or Y, Y | If earlier tests have determined that either $D_1$ or $D_2$ is the STP, but it has not been determined which of the two is the STP, and if the segment group meets the TR1 qualifications, then continue with segments 1 test TR1. See TR1 for qualifications. |
| 7 | T11 | 1, 2 | N, N | * | If earlier tests have determined that either $D_1$ or $D_2$ is the STP, but it has not been determined which of the two is the STP, and if the segment group does not meet the TR1 qualifications (see TR1 to see what the qualifications are), then an error in the analysis has occurred. Reevaluate. |
| 7 | T11 | 1, 2 | N, UN | N, Y | If earlier tests have not determined that $D_1$ is definitely the STP, then $D_1$ is a connecting point and $D_2$ is the STP. Processing ends. |
| 7 | T11 | 1, 2 | N, UN | Y, * | If earlier tests have determined that $D_1$ is definitely the STP, but that the status of $D_2$ is still unknown, continue with segments 1 & 2 test X03. |
| 7 | T11 | 1, 2 | UN, Y | *, Y | Same as case T11 = "NY". |
| 7 | T11 | 1, 2 | UN, N | Y, N | If earlier tests have not determined that $D_2$ is definitely the STP, then $D_2$ is a connecting point and $D_1$ is the STP. Processing ends. |
| 7 | T11 | 1, 2 | UN, N | *, Y | If earlier tests have determined that $D_2$ is |

TABLE 4-continued

Three-Segment Group Tests

| Depth | Test ID | Seg # | Result | $D_n$ STF | Significance |
|---|---|---|---|---|---|
| | | | | | definitely the STP, but that the status of $D_1$ is still unknown, continue with segments 1 & 2 test X03. (There are 3 paths to this result and significance. 1- E3 = N, DI2 = II, DI1 = DII, Seg 3 DI4 = Y 2- E3 = N, DI2 = II, DI1 = III, 2/3 DI4 = NY 3- E3 = Y, DI2 = II, DI1 = DII) |
| 7 | T11 | 1, 2 | UN, UN | * | This result indicates that the elapsed time at both $D_1$ and $D_2$ is unknown. Continue with segments 1 & 2 test X03, carrying forward any accumulated information about the statuses of $D_1$ and $D_2$. |
| 7 | T11 | 3 | n/a | Y | Not applicable to this segment. |
| 8 | CA1 | 1, 2, 3 | n/a | n/a | This test is not applicable to a 3-segment segment group. |
| 8 | T05 | 1, 2, 3 | n/a | n/a | This test is not applicable to a 3-segment segment group. |
| 8 | TR1 | 1 | any | n/a | The TR1 test is only used under the following circumstances: (1) the length of stay at both $D_1$ and $D_2$ is known and is less than or equal to the threshold amount as established by tests DI2; (2) the $D_1$ and $D_2$ threshold amounts are the same (e.g., either both 4 hours or both 12 hours); and (3) earlier tests (E3, DI2, DI1, DI4, and DI5) have established that both $D_1$ and $D_2$ cannot be connecting points. In practical terms, this means that the segment group is either (1) a closed triangle (E3 = "Y") with all 3 segments domestic (DI2 = "DD"); or (2) a closed triangle (E3 = "Y") with points $O_1$ and $D_3$ in country group 1 and points $D_1$ and $D_2$ in country group 2 (DI1 = "IDI"); or (3) not a closed triangle (E3 = "N") with points $O_1$ and $D_3$ in country group 1 and points $D_1$ and $D_2$ in country group 2 (DI1 = "IDI" and DI5 = "Y"); or (4) not a closed triangle (E3 = "N") with points $O_1$ and $D_3$ in country group 1, point $D_1$ in country group 2, and point $D_2$ in country group 3 (DI1 = "III" and DI4 = "NN" and DI5 = "Y") |
| 8 | TR1 | 1 | GT (time at $D_1$ > time at $D_2$) | Y, N | Assuming that this test has been applied under the appropriate circumstances (see above), $D_1$ is the STP and $D_2$ is a connecting point. All STFs in this segment group have now been determined. End processing. |
| 8 | TR1 | 1 | LT (time at $D_1$ < time at $D_2$) | N, Y | Assuming that this test has been applied under the appropriate circumstances (see above), $D_1$ is a connecting point and $D_2$ is the STP. All STFs in this segment group have now been determined. End processing. |
| 8 | TR1 | 1 | EQ (time at $D_1$ = time at $D_2$) | Y, N or N, Y or Y, Y | Assuming that this test has been applied under the appropriate circumstances (see above), either $D_1$ or $D_2$ or both $D_1$ and $D_2$ are STPs. Continue with segments 1 and 2 X03 tests. |
| 8 | TR1 | 2 | n/a | * | The TR1 test is not applicable to segment 2. However, the segment 1 TR1 test involves a comparison between length of stay at point $D_1$ and point $D_2$, and the result can establish the status of the $D_2$ STF. *Refer to the segment 1 TR1 test to see the status of the $D_2$ STF and what additional processing, if any, should be done. |
| 8 | TR1 | 3 | n/a | Y | Not applicable to this segment. |
| 9 | DS0 | 1, 2, 3 | n/a | n/a | This test is not applicable to a 3-segment segment group. |
| 9 | DS1 | 1, 2, 3 | n/a | n/a | This test is not applicable to a 3-segment segment group. |
| 9 | X03 | 1, 2 | any | * | It is particularly important to apply the X03 test only when indicated by the results of earlier tests. X03 is prone to giving results that are inconsistent with results of earlier tests. When X03 has been appropriately applied, and the results are inconsistent with the results of earlier tests, then the results of X03 are ignored, and $D_1$ and $D_2$ are both considered to be STPs. |
| 9 | X03 | 1, 2 | X, O ("O" and "blank" are considered | N, Y | Unless earlier tests have definitely determined that $D_1$ cannot be a connecting point, then $D_1$ |

TABLE 4-continued

Three-Segment Group Tests

| Depth | Test ID | Seg # | Result | $D_n$ STF | Significance |
|---|---|---|---|---|---|
| | | | to be the same) | | is a connecting point and $D_2$ is the STP. Processing ends. |
| 9 | X03 | 1, 2 | X, O | Y, Y | If earlier tests have determined that $D_1$ must be the STP, then this result of X03 is inconsistent with earlier tests. The X03 result is ignored, and both $D_1$ and $D_2$ are STPs. Processing ends. |
| 9 | X03 | 1, 2 | O, X | Y, N | Unless earlier tests have definitely determined that $D_2$ cannot be a connecting point, then $D_2$ is a connecting point and $D_1$ is the STP. Processing ends. |
| 9 | X03 | 1, 2 | O, X | Y, Y | If earlier tests have determined that $D_2$ must be the STP, then this result of X03 is inconsistent with earlier tests. The X03 result is ignored, and both $D_1$ and $D_2$ are STPs. Processing ends. |
| 9 | X03 | 1, 2 | X, X | N, Y | Unless earlier tests have definitely determined that $D_1$ and $D_2$ cannot both be connecting points, then $D_1$ and $D_2$ are connecting points. Processing ends. (There are eight paths that can arrive at this result with this significance: 1- E3 = N, DI2 = DI, T11 = UU 2- E3 = N, DI2 = DD, T11 = UU 3- E3 = N, DI2 = II, DI1 = DID, T11 = UU 4- E3 = N, DI2 = II, DI1 = DII, DI5 = N, T11 = UU 5- E3 = N, DI2 = II, DI1 = DII, T11 = UU 6- E3 = N, DI2 = II, DI1 = IID, seg 2 DI4 = N, T11 = UU 7- E3 = N, DI2 = II, DI1 = IDD, T11 = UU 8- E3 = N, DI2 = II, DI1 = III, 2/3 DI4 = NN, DI5 = N, T11 = UU ) |
| 9 | X03 | 1, 2 | X, X | Y, Y | If earlier tests have determined that $D_1$ and $D_2$ cannot both be connecting points, then this result of X03 is inconsistent with earlier tests. The X03 result is ignored, and both $D_1$ and $D_2$ are STPs. Processing ends. |
| 9 | X03 | 1, 2 | O, O | Y, Y | If the X03 test has been appropriately applied, with this result, both $D_1$ and $D_2$ are STPs. Processing ends. |
| 9 | X03 | 3 | n/a | Y | Not applicable to this segment. |

Referring to Tables 2 and 4, the level 2 tests for three-segment segment groups are shown. Certain tests are not applicable to three-segment segment groups. These include segment 1 and segment 2 test E3, segment 3 test DI2, segment 1 test DI4, segment 1 and segment 2 test DI5, segment 3 test T10, and segment 3 test T11. Further, tests E4, DI6, CA1, and T05 are not applicable to three-segment segment groups. Test SG1 is applied to determine the number of segments in the segment group. If there are exactly three segments in the segment group, then the test sequence shown in Table 4 and in this description should be followed.

The STF for segments 1 and 2 remains null unless otherwise specifically set to positive ("Y") or negative ("N") by one of the subsequent tests. The STF for segment 3 earlier was set to positive ("Y") by one of the level 1 tests. Processing continues on segments 1, 2, and 3 to determine the status of segments 1 and 2. Proceed with test E3.

Test E3 is applied only to segment 2, with reference to segments 1 and 3. If the origin of segment 1 and the destination of segment 3 are the same or co-terminous (test E3), then the three-segment trip forms a closed triangle, and either the destination of the first segment or the destination of the second segment, or both, are STPs. Otherwise, the trip forms three sides of a quadrilateral, and no information is gained regarding the status of segments 1 or 2. Processing skips test E4 and continues with test DI2.

Test DI2 is applied only to segments 1 and 2, with reference to adjacent segments. If segment 1 is not itself international and is not proximate to an international segment (test DI2), then it is labeled as "domestic" ("D") for purposes of the T11 threshold value. Otherwise, segment 1 will use the "international" ("I") T11 value. Segment 2 is handled similarly. The DI2 test by itself does not cause a change in STP status for either segments 1 or 2. If both segments 1 and 2 are found to be "international" by the DI2 test, processing continues with test DI1. Otherwise, processing continues with test T10.

Test DI1 is applied to all three segments, and the results are considered as a unit. Each segment is examined to see if the segment begins and ends within a single country group ("D") or if it begins in one country group and ends in another country group ("I"). There are six possible results of the DI1 test: D-I-D (segment 1 is "D", segment 2 is "I", and segment 3 is "D"), I-D-I, D-I-I, I-I-D, I-D-D, and I-I-I. If the DI1 result is D-I-I and if the trip forms a closed triangle (test E3), then the destination of segment 2 is the STP, and processing continues with test T10. If the DI1 result is D-I-D or I-D-D, or if the trip forms a closed triangle (test E3) and the DI1 result is I-D-I, I-I-D or I-I-I, then no new information is gained about segments 1 and 2, and processing continues with test T10. If the trip is not a closed triangle and the DI1 result is I-D-I, then no new information is gained about segments 1 and 2, and processing continues with test DI5. If the trip is not a closed triangle and the DI1 result is D-I-I, then no new information is gained about segments 1 and 2, and processing continues with test DI4 (segment 3 only). If the trip is not a closed triangle and the DI1 result is I-I-D, then no new information is gained about segments 1 and 2, and processing continues with test DI4 (segment 2 only). If the trip is not a closed triangle and the DI1 result is I-I-I, then no new information is gained about segments 1 and 2, and processing continues with test DI4 (segments 2 and 3).

Test DI4 is applied only to segment 2 with reference to segment 1, and/or to segment 3 with reference to segment 2, but only as directed by the preceding logic. Test DI4 determines if the destination of the current segment belongs to the same country group as the origin of the preceding segment ("Y") or if these two points belong to different country groups ("N"). At this point, some STFs can be set based on the results of the DI4 and DI1 tests, as best explained by the following Table 5.

TABLE 5

Setting the STF Using Tests DI1 and DI4

| DI1 result | DI4 result (segment 2) | DI4 result (segment 3) | Segment 1 STF | Segment 2 STF | Next Test |
|---|---|---|---|---|---|
| I-I-D | Y | n/a | Y | null | T10 |
| I-I-D | N | n/a | null | null | T10 |
| I-I-I | Y | N | Y | null | T10 |
| I-I-I | N | Y | null | Y | T10 |
| I-I-I | Y | Y | Y | Y | none-processing ends |
| I-I-I | N | N | null | null | DI5 |
| D-I-I | n/a | Y | null | Y | T10 |
| D-I-I | n/a | N | null | null | T10 |

Referring to the DI1 results in Table 5, a positive result from segment 2 test DI4 will set the STF for segment 1 to "Y." Conversely, a negative or not-applicable result from segment 2 test DI4 will leave the segment 1 STF as "null." This logic also applies to the results of segment 3 test DI4 and the setting of the segment 2 STF. If the results of test DI1 are I-I-I and both STFs have been set to positive, processing ends. If the results of test DI1 are I-I-I and both STFs remain null, processing continues with test DI5. Otherwise, processing continues with test T10.

Test DI5 is applied only to the third segment, with reference to segments one and two. If the destination of the third segment belongs to the same country group as the origin of the first segment (test DI5), then it is known that the destinations of segments one and two cannot both be CPs. Otherwise, no new information is gained about segments 1 and 2. Continue processing with test T10.

Test T10 is applied only to segments 1 and 2, with reference to the next later segment. The time spent at the destination of the first segment is determined (test T10), and then is compared to the applicable T11 threshold for segment 1. Segment 2 is handled similarly. The T11 threshold values are set by the user, and are based on travel industry standards. In June 2000, the typical "domestic" threshold value would be 4 hours and a typical "international" value would be a user-chosen number from 8 to 24 hours.

The time spent at the destination of the first segment is compared with the applicable T11 threshold and is found to be either greater than the threshold ("Y"), less than or equal to the threshold ("N"), or the relationship cannot be determined ("U"). The segment 2 result is determined similarly. These results are considered simultaneously. There are nine possible result combinations. Test T11 is not applicable to segment 3.

If both the first and second destinations are above their respective thresholds (Y-Y), then the destinations of segments 1 and 2 are both STPs, and processing stops. If the result is Y-N or Y-U and the destination of segment 2 was previously determined to be the STP, then the destinations of segments 1 and 2 are both STPs, and processing stops. If the result is Y-N or Y-U and the destination of segment 2 was not previously determined to be the STP, then the destination of segment 1 is the STP, and segments two and three form a new two-segment segment group which should be processed according to the two-segment group logic. If the results are N-Y or U-Y and the destination of segment 1 was previously determined to be the STP, then both destinations are STPs and processing stops. If the results are N-Y or U-Y and the destination of segment 1 was not previously determined to be the STP, then the destination of segment 2 is the STP, and segments 1 and 2 form a new two-segment segment group which should be processed according to the two-segment group logic. If the result is N-N, unless an earlier test has determined that the destinations of segments 1 and 2 cannot both be CPs, then both are CPs, and processing ends. If the result is N-N and an earlier test has determined specifically that the destination of either segment 1 or segment 2 is the STP, then the remaining destination is the CP, and processing ends. Otherwise, if the result is N-N and an earlier test has determined that the destination of either segment 1 or segment 2 is the STP, but it is not known which one is the STP, then the status of each segment destination remains null, and processing continues with test TR1. If the result is N-U and the destination of segment 1 has not already been established as the STP, then the destination of segment 1 is the CP and the destination of segment 2 is the STP, and processing ends. If the result is N-U and the destination of segment 1 is known to be the STP, then processing continues with test X03 to determine the status of the segment 2 destination. If the result is U-N and the destination of segment 2 has not already been established as the STP, then the destination of segment 2 is the CP and the destination of segment 1 is the STP, and processing ends. If the result is U-N and the destination of segment 2 is known to be the STP, then processing continues with test X03 to determine the status of the segment 1 destination. If the result is U-U, then no new information is gained about segments 1 and 2. Continue processing with test X03.

Tests CA1 and T05 are not applicable to three-segment segment groups. Test TR1 is applied only to segment 1, with reference to segment 2. If the time spent at the destination of segment 1 is greater than the time spent at the destination of segment 2, then the first segment STF is set to "Y", the second segment STF is set to "N", and processing stops. Similarly, if the time spent at the destination of segment 1 is less than the time spent at the destination of segment 2, then the first segment STF is set to "N", the second segment STF is set to "Y", and processing stops. Finally, if the time spent at the destination of segment 1 is equal to the time spent at the destination of segment 2, then no new information is gained about segments one and two. Continue processing with test X03. Tests DS0 and DS1 are not applicable to three-segment segment groups.

Test X03 is applied to both segments one and two. If the destination of segment 1 is marked as a connection in the course of pricing the itinerary, then the X03 result for segment 1 is "X". Otherwise, the X03 for segment 1 is "O". The results for segments one and two are considered simultaneously. To be considered valid, the X03 results cannot be inconsistent with STF information gained from earlier tests. There are four possible X03 results. If the result is X-O (segment 1 is "X" and segment 2 is "O"), and if an earlier test has not determined that segment 1 cannot be the CP (X03 is consistent with earlier results), then the destination of segment 1 is the CP, the destination of segment 2 is the STP, and processing ends. Similarly, if the result is O-X, and if an earlier test has not determined that segment 2 cannot be the CP (X03 is consistent with earlier results), then the destination of segment 1 is the STP, the destination of segment 2 is the CP, and processing ends. If the result is X-X, and an earlier test has not determined that the destinations of both segments 1 and 2 cannot be the CP, then both are CPs, and processing ends. If the result is O-O, or if the result is X-O, O-X, or X-X, and the result is inconsistent with an earlier test, then both destinations are STPs and processing ends.

Figure 5:
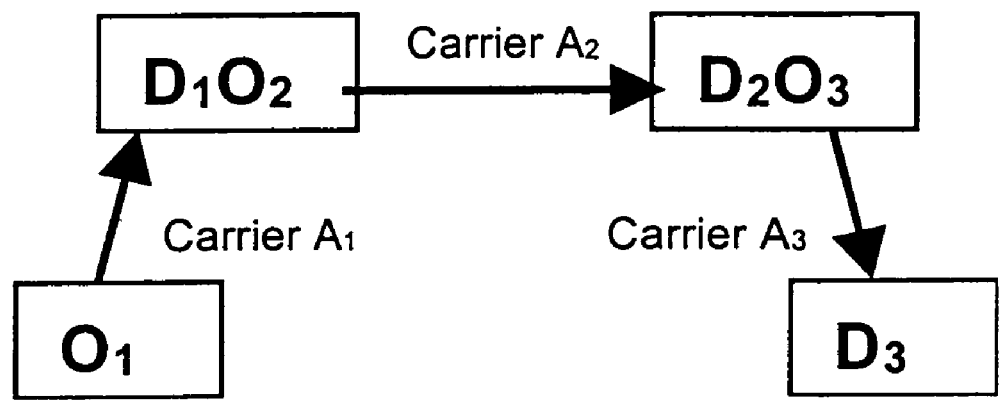
FIG. 5 is a block diagram illustrating a three-segment group according to the invention.
Figure 6:
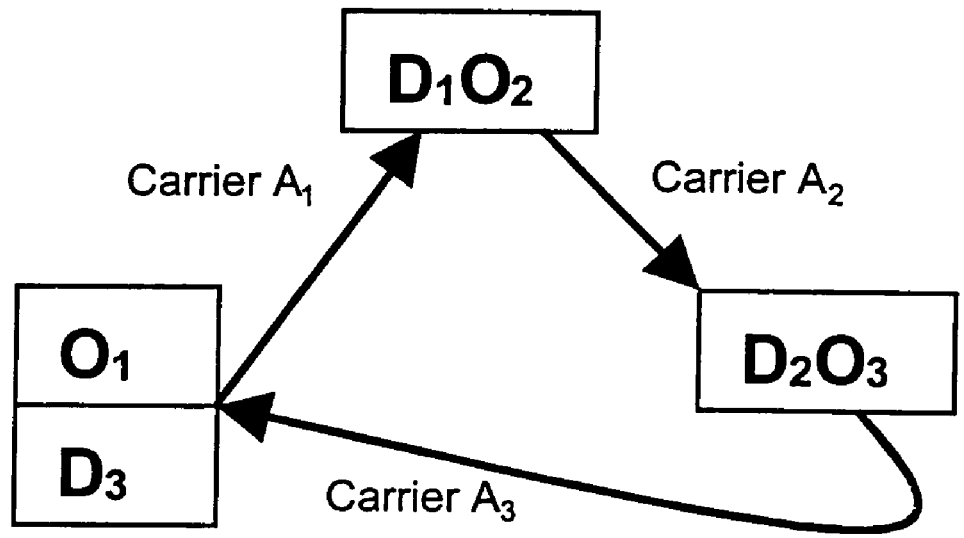
FIG. 6 is a block diagram illustrating another three-segment group according to the invention.

Referring next to FIGS. 5 and 6, a three-segment segment group will form three sides of a potentially four-sided figure (FIG. 5) or it will form a closed triangle (FIG. 6), as indicated by the segment 2 E3 test. The traveler departs $O_1$ and arrives at $D_3$ by way of $D_1O_2$ and $D_2O_3$ in sequence via carriers $A_1$, $A_2$, and $A_3$ in sequence. In FIG. 6, the origin $O_1$ and destination $D_3$ are represented as contiguous rectangles indicating that the trip is a round trip. In a three-segment segment group, when E3 is "no," nothing is known about the intermediate points $D_1O_2$ and $D_2O_3$, pending the results of subsequent tests. When E3 is "yes," at least one of the intermediate points is the STP.

For groups comprised of four or more segments, the multi-level test of the system 200 includes applying the level 1 tests of Table 1 and then applying the level 2 tests of Table 6 below. Table 6 illustrates the subset of the level 2 tests used to determine O&D services for groups of at least four segments. A depth of zero indicates a level 1 test.

TABLE 6

Four- and More-Than-Four-Segment Group Tests

Figure 8B:
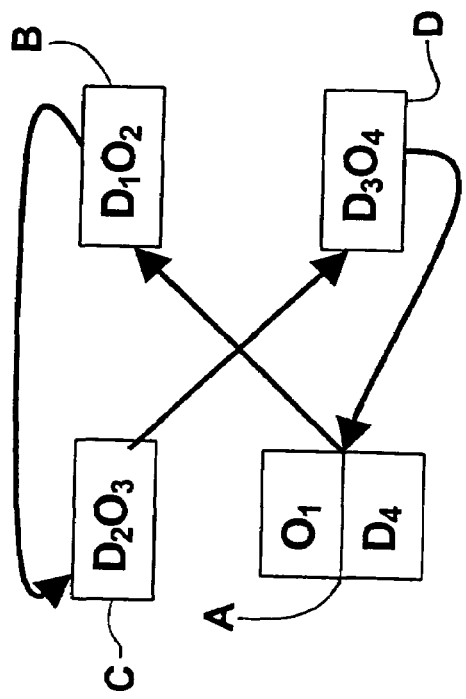
FIGS. 8A and 8B are block diagrams illustrating four-segment groups that have the same geometry for O&D purposes.
Figure 8A:
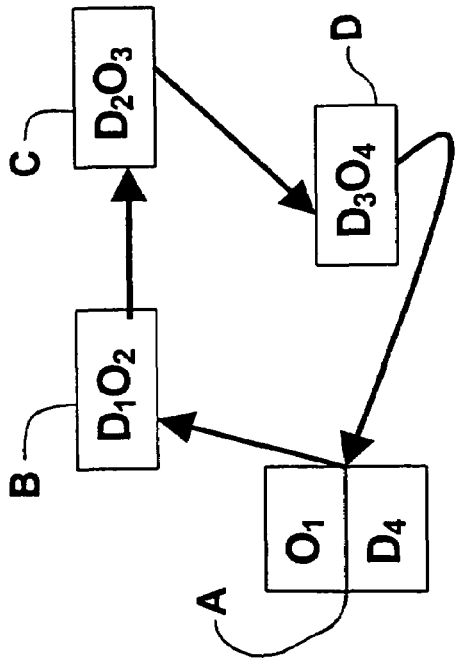
Figure 9:
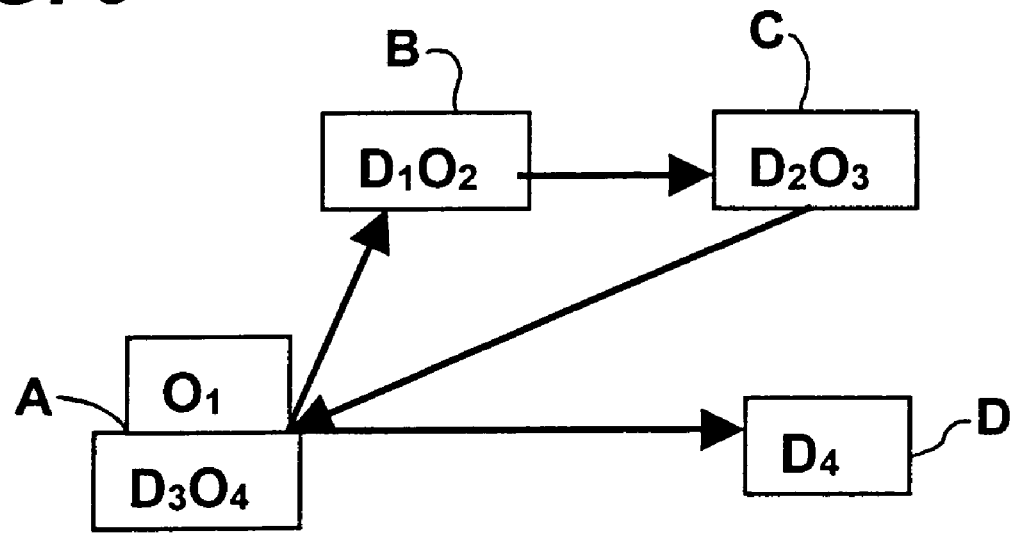
FIGS. 9–11 are block diagrams illustrating other possible four-segment groups according to the invention.
Figure 10:
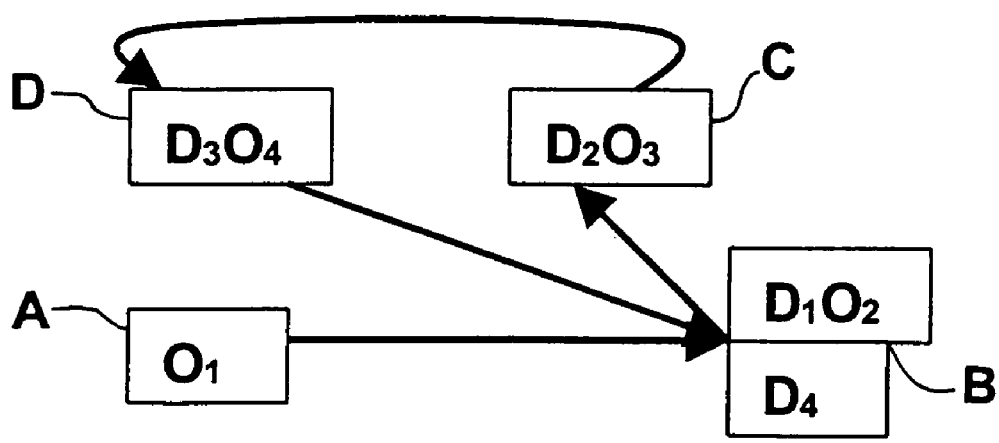
Figure 11:
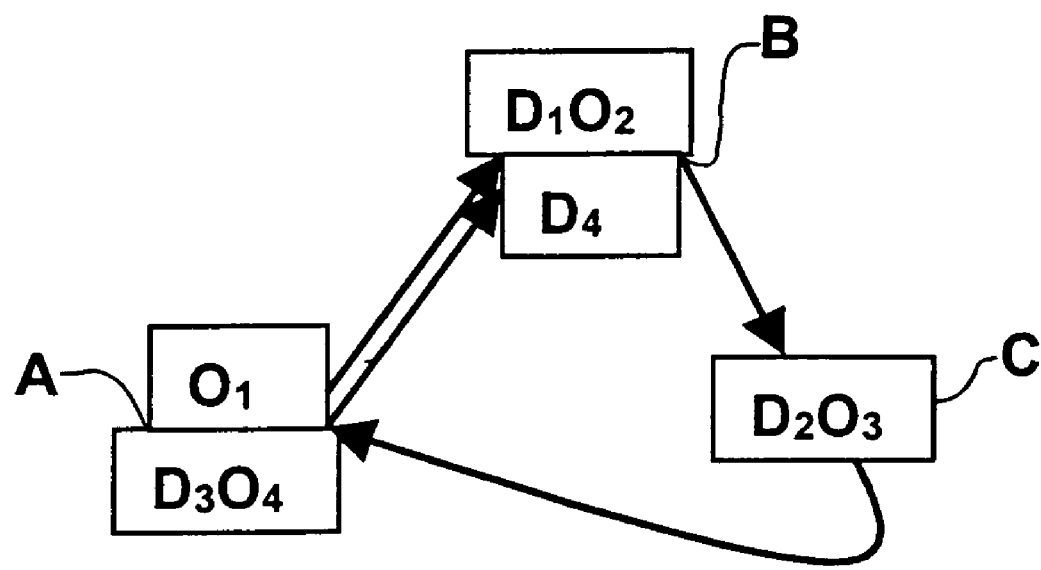

| Depth | Test ID | Applies to Segments | Results and Significance |
|---|---|---|---|
| 0 | CO1 | all | This level 1 test determines the final segment in the itinerary. By definition, the final segment is a service termination point (STP). |
| 0 | E1 | all except the last | This level 1 test establishes continuity or discontinuity between successive segments. Any segment that returns a "yes" result is the STP. |
| 0 | E2 | all except the last | This level 1 test establishes whether or not the "next" segment is a return to the origin of the current segment. Any segment that returns a "yes" result is the STP. |
| 1 | SG1 | all | Once all level 1 tests have been applied and evaluated, the initial segment groups are determined. This test counts the number of segments in each segment group. If the number is 4 or more, the logic in this table applies. |
| 2 | E3 | all except the first and last | A "yes" result identifies the current segment as the middle segment of a triangle trip pattern. Either $D_{n-1}$ or $D_n$, or both $D_{n-1}$ and $D_n$, are STP(s). FIGS. 9, 10, and 11 show examples of a triangle pattern embedded in a four-segment segment group. A "no" result gives no information about the status of $D_{n-1}$ or $D_n$. |
| 2 | E4 | 4, 5, ..., last | A "yes" result identifies the current segment as the final segment of a diamond (closed four-sided) trip pattern. At least one of the preceding three destinations must be the STP. FIG. 8 shows examples of a closed four-sided trip pattern. A "no" result gives no information about the status of $D_{n-3}$, $D_{n-2}$, or $D_{n-1}$. |
| 2 | Ex | x, x + 1, ..., last (x >= 5) | As explained in Table 2, this test, or rather series of tests, indicates the presence of a closed polygonal pattern within a segment group. A "yes" on any of these tests indicates that a "return to origin" has occurred, therefore, at least one of the intervening destinations is the STP. A "no" result gives no information about these intervening destinations. |
| 2 | DI2 | all | The result of this test sets the T11 threshold value. |
| 3 | DI1 | all | This test identifies whether a segment begins and ends within a single country group ("domestic") or if it begins and ends in different country groups ("international"). For the series of segments in the segment group, a change from "I" to "D" and then back to "I" indicates that at least one of the destinations of the "D" segments or the destination of the final "I" segment of the first group is the STP. For example, if the DI1 test of the seven segments of a segment group give a result of D-I-I-D-D-D-I, at least one of the destinations of segments 3, 4, 5, or 6 ($D_3$, $D_4$, $D_5$, or $D_6$) must be the STP. Note that the "opposite" change from "D" to "I" to "D" gives no STP information. If the seven segments in the previous example had results of D-I-I-D-D-D-D, no inference could be made about the STP status of any of the first six destinations. (The final destination is always the STP.) |
| 3 | DI4 | all except the first | While the DI1 test evaluates segments as being "domestic" or "international," the DI4 test asks if the destination of the current segment belongs to the same country group as the origin of the preceding segment. Tests DI1 and DI4 in combination give a picture of movement between and among country groups. Analogous to the "E" series of tests (which looked for "return to origin"), DI4 looks for "return to country group." As with "return to origin", exiting from and then returning to a country group establishes that at least one of the destinations outside the original country group is the STP. Since DI4 only looks back to the immediately preceding segment, a DI1 "I-I" result on the preceding and current ($D_{n-1}$ and $D_n$) segments, plus a DI4 "yes" result, would establish that $D_{n-1}$ is the STP. (Analogous to the E2 test.) |
| 4 | DI5 | all except the first two | This test is the same as DI4, except that it looks at the origin of two segments ago. In conjunction with DI1 results showing at least some "I" segments, a "yes" DI5 result indicates that at least one of the two preceding destinations ($D_{n-2}$ or $D_{n-1}$) is the STP. |
| 4 | DI6 | all except the first three | Similar to test DI5, except it considers the origin of three segments ago. If DI1 shows at least two "I" results and DI6 is "yes," then at least one of the three intervening destinations is the STP. |
| 4 | DIx | all except the first x-3 | Successive DI tests are performed until all country group relationships among all the segments have been determined. Exiting a country group and then returning to the same country group indicates that at least one of the intervening destinations is the STP. |
| 5 | T10 | all except the last | The result of this test is the length of stay at each destination, expressed in units of time or as "unknown." Later tests make use of these results. |

TABLE 6-continued

Four- and More-Than-Four-Segment Group Tests

| Depth | Test ID | Applies to Segments | Results and Significance |
|---|---|---|---|
| 5 | T11 | all except the last | The result of this test is an indication that the amount of time spent at the destination (determined by test T10) is above the threshold set by test DI2, at or below the threshold, or "unknown." All destinations where the length of stay is above the threshold is the STP. All destinations where the length of stay is equal to or less than the threshold are connecting points, unless this would produce an O&D service inconsistent with the indication of earlier tests. Usually, this means that T11 indicates that several consecutive destinations are at or below the threshold, but an earlier test has indicated that at least one of these destinations must be the STP. The TR1 test is used to resolve this dilemma. The X03 test resolves the status of destinations where the length of stay is unknown. However, if a series of segments alternate between known times at or below the threshold and unknown times, each run of unknown times is presumed to contain at least one STP. For example, seven consecutive segments have these times (K = known at or below the threshold; U = unknown): K-K-U-K-U-U-K. Assuming earlier tests have not established any STPs in this group, given these results, the third destination ($D_3$) is the STP, and at least one of the fifth and sixth Destinations ($D_5$ and/or $D_6$) is a |
| 6 | TR1 | all except the last | When dealing two or more consecutive segments with lengths of stay at or less than the threshold at their respective destinations, and where the threshold values are all the same (either all "domestic" thresholds or all "international" thresholds), the destination with the longest length of stay is the STP and the other destinations are connecting points. In the event that two or more destinations are tied for having the longest elapsed time at or below the threshold, then test X03 will determine which is the STP and which is a connecting point. In the event that TR1 is comparing known and unknown times, all the unknown times are assumed to be equivalent to the longest known time. These statuses will be resolved by test X03. Destinations in the same group with shorter times are marked as connecting points. |
| 7 | X03 | all except the last | After every other test has been considered, if there are still ambiguities about one or more destinations within the segment groups, the X03 test is applied. X03 simply looks at the Connection Indicator field in the data, but only for those destinations that have not definitely been established as either STPs or connecting points. If the results of all applicable X03 tests within a segment group do not contravene an earlier determination, then the results are used, and the remaining "unknown" destinations are marked as STPs or connecting points as indicated. If the results of all applicable X03 tests within a segment group are at odds with an earlier determination, then the Connection Indicators are flawed, and all remaining "unknown" destinations are marked as STPs. An example of flawed Connection Indicators would be on any closed polygonal pattern, where we know that at least one destination must be the STP. If the Connection Indicators for all destinations show "X" (a connection), the Connection Indicators as a group cannot be believed. The bias of the O&D invention is to assume a destination is the STP unless proved otherwise. |

Referring to Tables 2 and 6, the subset of level 2 tests in Table 6 are applied to segment groups comprised of at least four segments. When evaluating segment groups having four, five, or more segments, the essential logic becomes a little simpler, but the number of permutations increases because there are more segments to test.

With two- and three-segment segment groups, the invention considers factors such as overnight stays (test T05) and sequence of carriers (test CA1). When segment groups of four or more are evaluated, the results of these specialized tests are no longer relevant to the O&D determination. An overnight stay in the midst of a four-segment service, for example, tells us little about the traveler's intended destination. In fact, this test, and some others that produce useful results for Segment Groups with fewer segments, could actually lead to an inferior O&D determination. That being the case, the specialized tests are not used.

Test E3 is applied to all segments in the group except the first and last. Test E3 determines if the destination of the next segment is equivalent or co-terminous with the origin of the previous segment. A positive result from this test identifies the current segment as the middle segment of a triangle trip pattern and either or both destinations associated with the segments evaluated are STPs.

The remaining "E" tests determine if the itinerary contains closed polygonal trip patterns of four sides or more. Whenever a closed polygonal pattern is found, at least one of the destinations on the polygon preceding the segment that completed the polygon is the STP. If no portion of the itinerary forms a closed polygon, then no information is gained about any segment destination. Processing continues with test DI2.

Test DI2 is applied only to every segment, with reference to adjacent segments. Each segment is evaluated as to being "international" or immediately proximate to an international segment. If the segment is not international or adjacent to an international segment, then that segment is labeled as "domestic" for purposes of the T11 threshold value. Otherwise, the segment will use the "international" T11 value. The DI2 test by itself does not trigger a change in the STF. Instead, the results of DI2 are used by test T11. Processing continues with test DI1.

Test DI1 is applied to every segment, without reference to any other segment. Each segment is examined to see if the segment begins and ends within a single country group ("D") or if it begins in one country group and ends in another country group ("I"). The results of DI1 are then considered as a single sequence. For every run of "D" segments (i.e., one or more "domestic" segments) that is bracketed by "I" segments, at least one of the destinations of the "D" segments is the STP. Otherwise, if there is no pattern of the type "I-D-I", "I-D-D-I", "I-D-D-D-I", etc., then no new information is gained about any segment destination. Processing continues with the remainder of the "DI" tests.

The remainder of the DI tests (DI4, DI5, etc.) is applied to every segment that is sequentially far enough into the itinerary to have the requisite number of immediately preceding segments necessary for running the test. These DI tests determine if the destination of the current segment belongs to the same country group as the origin of the nth preceding segment ("Y") or if these two points belong to different country groups ("N"). After all possible DI tests have been performed, the sequence of travel among country groups has been established. Movement away from and back into any given country group establishes that at least one of the destinations preceding the segment that returns to the given country group is the STP. If no portion of the itinerary exits then returns to a country group "n", then no new information is gained about any segment destination. Processing continues with test T10.

Test T10 is applied to every segment except the final segment, with reference to the immediately succeeding segment. The time spent at every destination is determined (test T10), and then is compared to the applicable T11 threshold for the segment. The T11 threshold values are set by the user, and are based on travel industry standards. In June 2000, the typical "domestic" threshold value would be 4 hours and a typical "international" value would be a user-chosen number from 8 to 24 hours.

The time spent at the destination of the each segment is compared with the applicable T11 threshold and is found to be either greater than the threshold ("Y"), less than or equal to the threshold ("N"), or the relationship cannot be determined ("U"). The results are first considered individually. For every destination where the length of stay is greater than the threshold, that destination is the STP. For every destination where the length of stay is less than or equal to the threshold, that destination is the CP, unless earlier tests have determined that destination possibly cannot be the CP. If there is a group of destinations that are known to contain at least one STP, but it is not known specifically which one(s) is (are) STP(s), then the T11 threshold test cannot definitely establish any destination as the CP or the STP. The TR1 test will resolve most of these STFs when there are no unknown times.

The results of the T11 test are next considered as a sequence of "known times at or below the threshold" ("K") and "unknown times" ("U"). For every run of "U" destinations (i.e., one or more destinations where the length of stay is unknown) that is bracketed by "K" destinations without an intervening destination where the time is known to be above the threshold, at least one of the "U" destinations is the STP. Otherwise, no new information is gained about any segment destination. The status of any remaining "U" destinations is determined by the X03 test. Processing continues with the TR1 test.

Test TR1 resolves some cases where it is known that a group of destinations contains at least one STP, but it is unknown which specific destination is the STP and which is the CP. Test TR1 is applied only in the following circumstances: there are two or more consecutive destinations where (1) the STFs are null and (2) the lengths of stay are unknown or at or below the T11 threshold, and (3) the thresholds are all of the same type (all "domestic" or all "international"). Test TR1 applies only to groups of contiguous segments that meet the specified conditions. Test TR1 compares the lengths of stay at the destinations of all segments in the group. Segments from one group are not compared to segments in another group. Each destination is ranked from longest stay to shortest. Unknown times are treated as if they were equal to the longest time, and destinations that have the same length of stay share the same rank. If a single destination is ranked as the longest stay, then that destination is the STP and the remaining destinations are CPs, unless earlier tests have determined that they cannot all be CPs. If earlier tests have determined that the remaining destinations cannot all be CPs, then the TR1 run again for the remaining segments in the group. If more than one destination has the longest length of stay and if there is a single destination with the shortest length of stay, then the shortest stay destination is marked as the CP and TR1 is rerun for the remaining segments in the group. TR1 is rerun iteratively until either all destinations have had their STF set to a non-null value or until further runs of TR1 do not change the remaining STFs. Continue processing with test X03.

Test X03 is applied only to segments that have a null STF. Test X03 uses the connection indicators established in the course of pricing the itinerary. If a fare break occurs at a destination, its X03 value is "O". Otherwise, its X03 value is "X". If the destination of segment one is marked as a connection in the course of pricing the itinerary, then the X03 result for segment one is "X". Otherwise, the X03 for segment one is "O". All of the X03 results for the itinerary are considered simultaneously and are judged to be either "valid" or "invalid." X03 is invalid if the results are inconsistent with what is known about the null STFs. Inconsistency occurs when an "X" value applies to a destination known not to be the CP or when an "O" value applies to a destination known not to be the STP. Otherwise, X03 is valid and the results will be used; all "X" destinations are CPs, all "O" destinations are STPs, and processing ends. If test X03 is invalid, the results of X03 are ignored; all remaining null STF destinations are STPs, and processing ends.

Figure 7:
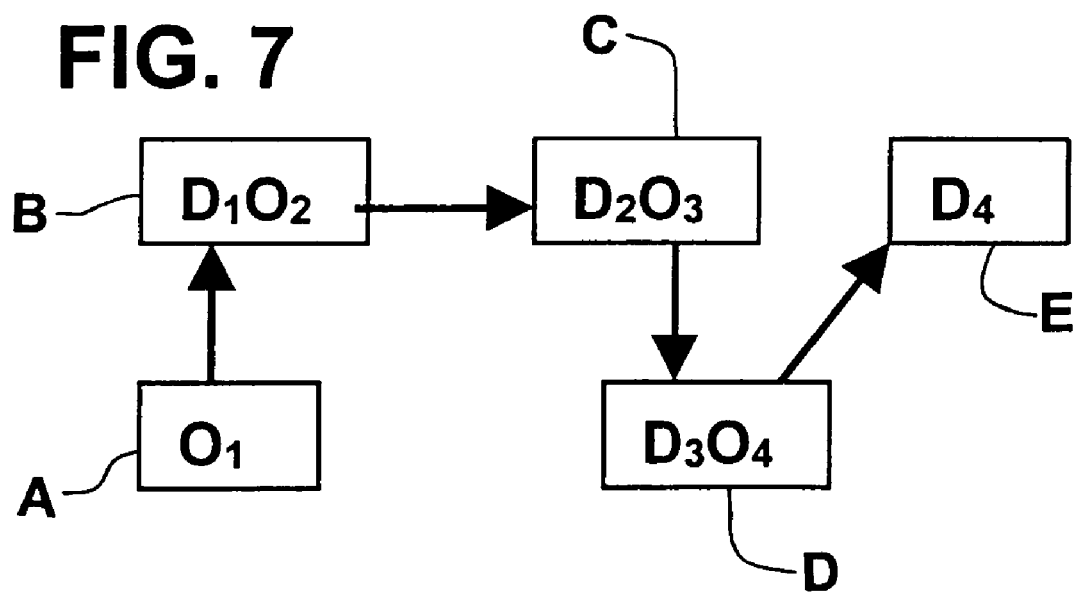
FIG. 7 is a block diagram illustrating one of the five possible four-segment groups according to the invention.

Referring next to FIGS. 7–11, examples of four-segment groups are shown. A continuous four-segment segment group may have one of five possible geometries depending on which points are visited more than once in the group. In the first of these examples (FIG. 7), no points are common. In this explanation, the letters A through E are used to emphasize that the five points are all different from one another and non-coterminous. The traveler starts at a point A, then proceeds to points B, C, D, and E. FIG. 7 uses the $O_n$ and $D_n$ designations for these points. "A" is $O_1$, "B" is $D_1O_2$, and so on.

Referring next to FIG. 8, the second case is illustrated by two examples that represent the same geometry for O&D purposes. In this case, the traveler starts at point A, then proceeds to points B, C, and D, before returning "home" to A (this is a round trip or a circle trip). In the leftmost example, the $O_1D_1$ and $O_3D_3$ segments do not cross each other, and the entire group forms a "diamond" shape (more properly, a quadrilateral). In the rightmost example, the $O_1D_1$ and $O_3D_3$ segments do cross each other, forming an "X" with a closed top and bottom, or an "hourglass" shape.

Referring next to FIGS. 9 and 10, the third and fourth cases involve a triangle pattern within the four segments, with an "extra" segment either at the beginning or at the end. FIG. 9 shows the sequence A-B-C-A-D, where the destination of the third segment is the same point as the origin of the first segment. With this geometry, either point B ($D_1O_2$) or point C ($D_2O_3$), or both, must be the STP. Point A ($D_3O_4$) may or may not be the STP.

Referring next to FIG. 10, the fourth case is the same as the third case, except the order of travel is reversed. FIG. 10 shows the sequence A-B-C-D-B. As before, at least one of the outbound triangle points (here, $D_2O_3$ and $D_3O_4$) must be the STP.

Referring next to FIG. 11, the fifth case involves "circular" travel around a triangle, with the sequence A-B-C-A-B. In this case, at minimum, one of these two statements is true: either point C ($D_2O_3$) is the STP, or both points B ($D_1O_2$) and A ($D_3O_4$) are STPs.

Any other potential sequence of points in a four-segment trip would involve either an immediate return to a previous origin (the sequence A-B-A-C-D, for example) or a sequence where the origin and destination of a given segment are the same (A-B-B-C-D, for one). The former case would be broken into two smaller segment groups due to a "yes" result in level 1 test E2 (next destination same as current origin). The latter case violates an assumption of a valid itinerary (a segment cannot begin and end at the same place).

In general, the method of the invention determines one or more O&D services for the travel itinerary 206 having segments stored in a computing system having the processor 202 operating according to an accompanying program instruction set. The method comprises the steps of:

inputting itinerary data derived from the itinerary 206 into the processor 202;

determining one or more O&D services for the itinerary 206 by applying a multi-level test to the itinerary data; and outputting the O&D services from the tested itinerary data.

While particular embodiments of the invention have been shown and described, it will be obvious to those skilled in the art that various changes and modifications may be made without departing from the present invention in its broader aspects. It is intended that all matter contained in the above description and shown in the accompanying drawings shall be interpreted as illustrative and not in a limiting sense.

Appendix A

Glossary

The description of the invention uses terms commonly understood in the travel industry. It also uses terms that are unique to the invention or terms that have unique meaning to the invention. Many terms that might not be commonly understood are explained below.

ARNK

Travel industry acronym for Arrival Not Known. Pronounced "uh-RUNK." Synonym for "surface segment." See Surface.

Carrier

Provider of conveyance, typically an airline or a railroad, e.g., "United Airlines." Generically, abbreviated in this document as an "A," plus a subscript to designate the ordinal segment served. For example, $A_2$ would be the carrier providing conveyance on the second segment. Also shown as a function, e.g., Carrier ($O_1D_1$), meaning "the carrier that provides conveyance from point $O_1$ to point $D_1$." See Segment.

The approach that this invention takes is to retain the identity and sequence of all carriers that provide service on the O&D pair. This is done by retaining the carrier identity from each segment. When the itinerary is broken into segment groups and ultimately into O&D services, the data associated with each segment constituting the O&D service is retained. If the data of the same type (carrier, class of service, or fare basis) from every segment of the O&D pair is the same, then that single value is used as the O&D attribute. If the data is not the same, all "runs" of the same data are combined, then the remaining sequence is stored. The class of service and fare basis are handled in this way as well.

City

This is a specific travel industry term that refers to an area to which transportation service is provided. One or more airports or other transportation centers will serve a city. For example, the city of "Dallas/Fort Worth" is served by both the DFW and DAL airports, plus assorted train and bus stations and smaller airports. All of these would be coterminous points within the Dallas/Fort Worth city. See Coterminous.

Connection

A standard travel industry term that indicates a destination that is used as an intermediate point in the application of a fare to a more distant destination. Alternately, a destination where the passenger does not have stopover rights. Connections are indicated with an "X" on a ticket or in a fare calculation. The maximum amount of time that may be spent at a connecting point is typically either four hours or twenty-four hours, depending on the itinerary. See Stopover.

Notationally, individual connection points are indicated with a "C," plus a subscript, e.g., $C_1$.

When used as a function, e.g., "Is a given destination a connection?", it is shown as Connect ($D_n$).

Co-terminal

A terminal (airport, train station, etc.) that is part of a multi-terminal city. See City and Coterminous.

Coterminous

Different points within a single city. As an example, the Ontario Calif. airport (ONT) and the Los Angeles airport (LAX) are both considered a part of the Los Angeles "city" (also coded LAX). As such, ONT and LAX are coterminous. Airlines Reporting Corporation maintains a base list of coterminous points in the ARC Industry Agents' Handbook. See City. When used as a function, a yes or no result is returned. Expressed as "~". For example, $D_{n+1} \sim O_{n+1}$ asks "Is $D_{n+1}$ coterminous with $O_{n+1}$?" If the user of the invention does not have access to a table of coterminous points, then the result of this function, when used, should always be set to "no."

Country Group

A user-defined set of countries. Travel within a country group is considered "domestic" by the invention. Travel between country groups is considered "international."

When used as a function, the name of the country group is returned. An example of the function is CountryGroup ($O_1$) meaning "the country group that contains point $O_1$."

"Country Group" is a construct created and used by the invention.

Date of Arrival

The date the conveyance arrives at its destination.

Notationally, Date ($D_n$) represents the date of arrival at the destination of the nth segment.

Date of Departure

The date the conveyance leaves its origin.

Notationally, Date $(O_n)$ represents the date of departure from the origin of the nth segment.

Destination

Usually, destination of a segment. See Destination, Segment and Segment.

Notationally, expressed as "D", plus a segment subscript, e.g., $D_1$ (the end point of the first segment) or $D_n$ (the end point of the nth segment).

Destination, Current

Destination of the segment currently being evaluated by the invention.

Destination, Next

Destination of the segment immediately following the current segment. See Segment, Current.

Destination, O&D

The end point of an O&D pair. Expressed in terms of the segment to which it belongs. Also called a service termination point. See Destination.

Destination, Segment

The terminating point of a segment, expressed as an airport, a rail station, a bus station, or a city.

Usually, common travel industry codes are used. See Destination.

Distance

A function that returns the minimum, non-negative great circle distance between two points. An example is Distance $(D_n O_{n-1})$, meaning "the distance between point $D_n$ and point $O_{n-1}$." See Great Circle Distance.

Domestic

Travel wholly within a country group. Can apply to a segment, a series of segments, an O&D pair, and an itinerary. See International.

A "yes" result of the Domestic function (see next paragraph).

When used as a function, a yes or no result is returned. An example is Domestic $(O_{n-1}D_{n-1})$, meaning "Is the segment $O_{n-1}D_{n-1}$ domestic?"

Equivalence

A function to determine if two points are exactly the same. Expressed as "==". Returns a yes or no result.

For example, $O_n$==$D_{n+1}$ asks if point $O_n$ is exactly the same as point $D_{n+1}$. The Equivalence function is the opposite of the Surface function. See Surface and Non-coterminous.

Great Circle Distance

A geometric and cartographic term. Great Circle Distance is the shortest arc between two points on the surface of a sphere. See Distance for information on the related function.

International

Travel between country groups. A "no" result of the Domestic function. See Domestic.

Itinerary

A sequence of segments, constituting a trip.

Last

A function that returns a yes or no result. Shown as Last $(O_n D_n)$, meaning "Is this segment (the nth segment) the final segment in the itinerary?" See Segment, Final.

Level 1 Test

A test used by the invention to identify service termination points in an itinerary. A level 1 test by itself can return a value that immediately indicates a service termination point.

Level 2 Test

A test used by the invention to identify service termination points in an itinerary. A level 2 test is used in conjunction with the results of other tests (level 1 and level 2) in order to determine a segment destination's status as a termination point or a connecting point.

Market Pair

Synonym of O&D Pair. See O&D Pair.

Non-Coterminous

Two different points that do not belong to the same city. See City.

O&D Pair

The beginning and ending points of a single O&D service. Synonym of Market Pair. See O&D Service.

O&D Service

A group of one or more segments that a traveler uses to achieve his or her transportation objectives. An itinerary consists of one or more O&D services (e.g., trips).

The O&D service is defined by the starting point (the initial origin) and the ending point (the final destination, or service termination point).

The O&D service has many attributes: sequences of connecting points, carriers, classes of service, and fare bases; departure date/time; arrival date/time; and cost.

An objective of the invention is to determine the O&D services (e.g., trips) in an itinerary.

Open

Notationally, shown as Open $(O_n D_n)$, with a result of yes or no. See Segment, Open.

The invention evaluates time spent at a destination and does not explicitly look for Open segments. An "unknown" time is considered a valid proxy for the presence of an Open segment.

Origin

Usually, origin of a segment. See "Origin, Segment" and Segment.

Notationally, expressed as "O", plus a segment subscript, e.g., $O_1$ (the beginning point of the first segment) or $O_n$ (the beginning point of the nth segment).

Origin, Current

Origin of the segment currently being evaluated by the invention.

Origin, Next

Origin of the segment immediately following the current segment. See Segment, Current.

Origin, O&D

The beginning point of an O&D Pair. Sometimes called Initial Origin. Expressed in terms of the segment to which it belongs. See Origin.

Origin, Segment

The starting point of a segment, expressed as an airport, a rail station, a bus station, another terminal, or a city. Usually, common travel industry codes are used. See Origin.

Return
Indicates a condition where the destination of the next segment is equivalent to or coterminous with the origin of the current segment.

Segment
A continuous unit of transportation, provided by a carrier, carrying a single designation, e.g., a single flight number. Shown as a subscript in this invention's notation. Examples include "$A_1$" (the carrier of the first segment) and "$D_n$" (the destination of the nth segment).

Segments are commonly referred to in terms of their beginning and ending points, so notationally, "$O_1D_1$" would refer to the first segment, i.e., the segment that begins at point $O_1$ and ends at point $D_1$.

The origin and destination of any given segment must be different from each other.

A segment normally has these attributes: ordinal number representing the segment's chronological place in the itinerary, carrier, flight number or other unit designation, class of service, fare basis, point of origin (departure), point of destination (arrival), date of departure, time of departure, date of arrival, time of arrival.

Segment, Current
A segment currently being evaluated by the invention.

Segment, Final
Chronologically, the last segment in the itinerary; the end of the trip. If there is only one segment in the itinerary, then that segment is both the first segment and the final segment.

Segment, First
Chronologically, the first segment in the itinerary; the beginning of the trip.

Segment, Next
The segment that immediately follows the current segment. If the current segment is the final segment, there is no next segment. See "Segment, Current" and "Segment, Final".

Segment, Open
A standard travel industry term meaning an unreserved segment. Open segments are used to facilitate the pricing and ticketing of an itinerary where some portions are unreserved. Characteristically, an open segment will lack the following attributes: flight number or other unit designation, departure date, departure time, arrival date, and arrival time. In place of the flight number will be the word OPEN (as here, usually shown in capital letters). See Open.

Segment, Prior
The segment immediately preceding the current segment. If the current segment is the first segment, there is no prior segment. See "Segment, Current" and "Segment, First".

Service Termination Flag
Initialized to "null," the service termination flag is set for each destination in the itinerary. The flag indicates the segment destination's status as the terminus (a "yes" value) or a connecting point (a "no" value) of an O&D service.

Service Termination Point
As determined by the invention, an attribute of a destination, indicating the "D" point of an O&D service. Every trip must have at least one service termination point. See "Destination, O&D" and "O&D service".

Identification of service termination points is the high-level activity performed by the invention as it determines all of the O&D services for an itinerary.

Stopover
A standard travel industry term. A stopover is a destination where a passenger is entitled to spend essentially an unlimited amount of time. Stopovers are used in fare construction. Stopovers are indicated with either an "O" or a blank on a ticket or in a fare calculation. A stopover is the opposite of a connection.

Subscript
Subscripts are used in the notation to indicate the ordinal segment number. Examples are $O_1$, indicating the origin of the first segment and $D_n$, indicating the destination of the nth segment.

Surface
A discontinuity in a trip. Also known as a "surface segment" or an "ARNK." A "surface" occurs when the end point of one segment is not equivalent to the beginning point of the next segment. The (implied) conveyance between these two points is not considered a part of the trip and is not subject to O&D analysis. See ARNK.

When used as a function, a value of yes or no is returned. Shown as "<>." An example is $D_n<>O_{n+1}$, meaning "Are $D_n$ and $O_{n+1}$, different places from each other?" The Surface function is the opposite of the Equivalence function. See Equivalence.

Time (Spent at a Destination), Calculation of
The invention uses the amount of time spent at a destination to determine the O&D pairs in a trip. The calculation is the difference between the departure date-time from the next origin and the arrival date-time at the current destination. The result may be a duration (e.g., 2 days, 8 hours, 15 minutes) or "unknown."

An example of notation is Time ($D_nO_{n+1}$), meaning "How much time is spent at the nth destination, based on the date-time of arrival at $D_n$ and the date-time of departure from $O_{n+1}$?"

Trip
From an initial location, a series of transportation events for a person ("passenger").

Trip, Continuous
A trip that contains no surface segments between non-coterminous points. See Non-coterminous and Surface.

Trip, Diamond
A continuous four-segment trip where the first origin is equivalent to or coterminous with the final destination, the first destination is neither equivalent to nor coterminous with the third destination, and the second destination is neither equivalent to nor coterminous with the fourth (final) destination.

A section of an itinerary that has the characteristics of a diamond trip.

Trip, Triangle
A continuous three-segment trip where the first origin is equivalent to or coterminous with the final destination, i.e., $O_1=D_3$ or $O_1\sim D_3$.

A section of an itinerary that has these characteristics: $O_n=D_{n+2}$ or $O_n\sim D_{n+2}$.

What is claimed is:

1. A method for determining at least one trip for a travel itinerary having segments stored in a computing system having a processor operating according to an accompanying program instruction set, said method comprising the steps of:

inputting itinerary data derived from the itinerary into the processor, said itinerary data defining two or more segments, each of said segments having an origin and a destination;

applying a multi-level test to each of the segments defined by the input itinerary data to identify the destination of said segment as a connection or a termination, wherein applying the multi-level test to each of the segments comprises determining that the destination of each of the segments having a next segment is both non-coterminous and non-equivalent to the origin of the next segment; and outputting the trip in response to said applying step wherein the trip is defined by a series of tested segments in which only the last segment in the series has a destination which is a determined termination.

2. The method of claim 1 wherein a first level of the multi-level test comprises determining that the trip is available for each and every segment, and wherein the step of applying the multi-level test further comprises the step of applying the first level to the segments and returning the trip for the segments when the step of applying the first level indicates that the trip is available for each and every segment.

3. The method of claim 2, wherein the trip is available when the step of applying the first level indicates that:
the destination of each of the segments having a next segment is both non-coterminous and non-equivalent to the origin of the next segment.

4. The method of claim 2 wherein the segments are in groups, and wherein the first level of the multi-level test further comprises determining that the trip is not available for at least one segment and determining that the trip is available for the last segment of each group, and wherein the step of applying the multi-level test further comprises the step of sequentially separating the segments into the groups when the step of applying the first level indicates that the trip is not available for at least one segment, and when the step of applying the first level further indicates that the trip is available for the last segment of each group.

5. The method of claim 4 wherein the step of applying the multi-level test further comprises the step of applying a second level to the groups that contain multiple segments and returning the trip for the groups.

6. The method of claim 5 wherein the step of applying the second level further comprises the steps of applying the following tests to each segment until one of the tests indicates that the trip is available for the segment:
determining a total number of segments in the group;
then determining when a next destination is equivalent to or coterminous with a previous origin;
then determining when a current destination is equivalent to or coterminous with an origin from three segments prior; and
then determining when the current destination is equivalent to or coterminous with an origin from a predefined number of segments prior.

7. The method of claim 6, further comprising the steps of:
then determining when a current origin and the current destination are within a same country group and the segment is not proximate to a segment in which an origin and a destination are within a different country group;
then determining when the current origin and the current destination are within a same country group;
then determining when the current destination and the previous origin are within a same country group;
then determining when the current destination and an origin from two segments prior are within a same country group;
then determining when the current destination and the origin from three segments prior are within a same country group;
then determining when the current destination and an origin from a second predefined number of segments prior are within the same country group;
then determining when an amount of time spent at the current destination exceeds a predefined threshold;
then determining when a carrier of the segment is equivalent to a carrier of a next segment;
then determining when a departure from a next origin occurs on a later date than an arrival at the current destination;
then determining the relationship between time spent at the current destination and time spent at a next destination;
then determining when a distance from the current destination to the previous origin is less than a distance from the current destination to the current origin and less than a distance from a previous destination to the previous origin; and
then determining when the current destination is marked as a connection.

8. The method of claim 5, wherein the step of applying the second level further comprises the steps of applying the following tests to each segment until one of the tests indicates that the trip is available for the segment:
determining a total number of segments in the group;
determining when the segment is a middle segment of a triangle trip;
determining when the segment is a final segment of a diamond trip; and
determining when the segment is a final segment of a closed polygonal trip.

9. The method of claim 8, further comprising the steps of:
then determining when a current origin and the current destination are within a same country group and the segment is not proximate to a segment in which an origin and a destination are within a different country group;
then determining when the current origin and the current destination are within a same country group;
then determining when the current destination and the previous origin are within a same country group;
then determining when the current destination and an origin from two segments prior are within a same country group;
then determining when the current destination and the origin from three segments prior are within a same country group;
then determining when the current destination and an origin from a second predefined number of segments prior are within the same country group;
then determining when an amount of time spent at the current destination exceeds a predefined threshold;
then determining when a carrier of the segment is equivalent to a carrier of a next segment;
then determining when a departure from a next origin occurs on a later date than an arrival at the current destination;
then determining the relationship between time spent at the current destination and time spent at a next destination;

then determining when a distance from the current destination to the previous origin is less than a distance from the current destination to the current origin and less than a distance from a previous destination to the previous origin; and then determining when the current destination is marked as a connection.

10. The method of claim 1, wherein each of the segments contains a departure city and an arrival city, further comprising the step of invalidating the determination when the departure city and the arrival city of at least one segment are equivalent.

11. The method of claim 1, further comprising the step of invalidating the determination when the segments are ordered non-chronologically.

12. The method of claim 1, further comprising the steps of invalidating the determination when the itinerary contains a typographical error and invalidating the determination when the itinerary contains a content-based error.

13. The method of claim 1, wherein the segments are surface segments or non-surface segments, further comprising the step of invalidating the determination when the itinerary contains all surface segments.

14. The method of claim 1, further comprising the step of invalidating the determination when the itinerary contains duplicate or extraneous segments.

15. The method of claim 1, further comprising the steps of:
electronically providing an input system which inputs itinerary data derived from the itinerary into the processor, said itinerary data having two or more segments, each of said segments having a destination;
electronically providing an evaluation system which applies the multi-level test to each segment defined by the itinerary data to identify the destination of said segment as a connection or a termination; and
electronically providing an output system which outputs the trip in response to said evaluation system wherein the trip is defined by a series of tested segments in which only the last segment in the series has a destination which is a determined termination.

16. The method of claim 2 wherein the itinerary data includes a current segment, current destination, current origin, next segment, next destination, and a next origin, and wherein the step of applying the first level to the segments further comprises the step of applying the following test to the current segment:
determining when the next destination is equivalent to the current origin.

17. The method of claim 16, wherein the trip is available when the step of applying the first level indicates that:
the next destination is the equivalent to the current origin.

18. The method of claim 17, wherein the itinerary data includes a current segment, current destination, current origin, next segment, final segment, next destination, and a next origin, and wherein the step of applying the first level to the segments further comprises the step of applying the following test to the current segment:
determining when the current segment is the final segment.

19. The method of claim 18, wherein the trip is available when the step of applying the first level indicates that:
the current segment is a final segment.

20. A computer-implemented system which implements a program for determining at least one trip for a travel itinerary having itinerary data stored in a computing system having a processor operating according to an accompanying program instruction set, said system comprising:
an input system which inputs itinerary data derived from the itinerary into the processor, said itinerary data defining two or more segments, each of said segments having an origin and a destination;
an evaluation system which applies a multi-level test to each of the segments defined by the itinerary data to identify the destination of said segment as a connection or a termination, wherein the evaluation system determines when the destination of each of the segments having a next segment is both non-coterminous and non-equivalent to the origin of the next segment; and
an output system which outputs the trip in response to said evaluation system wherein the trip is defined by a series of tested segments in which only the last segment in the series has a destination which is a determined termination.

21. The system of claim 20, further comprising a storage device storing the travel itinerary, and wherein the processor accessing the stored travel itinerary further comprises:
testing software that selectively applies a first and second test set to each segment defined by the itinerary data; and
determining software responsive to the testing software that determines the trip for the travel itinerary.

22. The system of claim 20, further comprising a storage device, said storage device connected to the processor and storing a program for controlling the processor, said processor operative with the program:
to input itinerary data derived from the itinerary into the processor, said itinerary data having two or more segments, each of said segments having a destination;
to apply the multi-level test to each segment defined by the itinerary data to identify the destination of said segment as a connection or a termination; and
to output the trip in response to the multi-level test wherein the trip is defined by a series of tested segments in which only the last segment in the series has a destination which is a determined termination.

23. A method for determining travel cost information for a travel itinerary stored in a computing system having a processor operating according to an accompanying program instruction set, said method comprising the steps of:
determining at least one trip for the travel itinerary by applying a multi-level test to each segment having an origin and a destination defined by itinerary data derived from the travel itinerary to identify the destination of said segment as a connection or a termination, wherein applying the multi-level test to each segment comprises determining that the destination of each segment having a next segment is both non-coterminous and non-equivalent to the origin of the next segment, said trip being defined by a series of tested segments in which only the last segment in the series has a destination which is a determined termination;
inputting itinerary travel costs derived from the travel itinerary into the processor;
calculating travel costs for the determined trip;
comparing the calculated travel costs with the derived itinerary travel costs to produce travel cost information; and
outputting the travel cost information.

24. The method of claim 23, wherein the derived travel costs include a segment fare associated with the last segment of each trip in the travel itinerary.

25. The method of claim 24, wherein the derived travel costs include a total itinerary cost.

26. The method of claim 25, wherein the step of calculating comprises the step of summing the segment fares of each trip when the sum of all the segment fares equals the total itinerary cost.

27. The method of claim 24, wherein the derived travel costs include a total base fare itinerary cost.

28. The method of claim 27, wherein the derived travel costs include a total itinerary tax cost.

29. The method of claim 28, wherein when the sum of the segment fares equals the total base fare itinerary cost, the step of calculating comprises the steps of:
  determining an intermediate cost for each trip by summing the segment fares of each trip;
  determining a fractional value for each trip that represents a comparison between the intermediate cost of each trip and the total base fare itinerary cost;
  determining a tax cost value for each trip by applying the fractional value for each trip to the total itinerary tax cost; and
  determining a final cost for each trip by adding the tax cost value of each trip to the corresponding intermediate cost for the trip.

30. The method of claim 23, wherein the derived travel costs include a total itinerary cost.

31. The method of claim 30, wherein the step of calculating comprises the steps of:
  determining a total number of trips for the travel itinerary; and
  determining the cost of each trip by dividing the total itinerary cost by the determined total number of trips.

32. The method of claim 23, wherein each trip includes an origin city and a destination city, and wherein the step of calculating comprises the steps of:
  determining a great circle distance for each trip by measuring a distance from the origin city to the destination city;
  determining a total itinerary mileage by summing the great circle distances of each trip;
  determining a fractional value for each trip by comparing the great circle distance of the trip with the total itinerary mileage; and
  determining a cost for each trip by applying the fractional value for each trip to the total itinerary cost.

33. The method of claim 23, wherein the step of comparing comprises the steps of:
  determining when the calculated travel costs exceed the derived itinerary travel costs;
  responsive to a determination that the calculated travel costs exceed the derived itinerary travel costs, sequentially subtracting a single currency unit from each of the calculated travel costs, ordered from lowest-cost to highest-cost, until the calculated travel costs equal the derived itinerary travel costs;
  determining when the derived itinerary travel costs exceed the calculated travel costs; and
  responsive to a determination that the derived itinerary travel costs exceed the calculated travel costs, sequentially adding a single currency unit to each of the calculated travel costs, ordered from highest-cost to lowest-cost, until the calculated travel costs equal the derived itinerary travel costs.

34. A method for determining one or more origin and destination (O&D) services for a travel itinerary having segments stored in a computing system having a processor operating according to an accompanying program instruction set, said method comprising the steps of:
  inputting itinerary data derived from the itinerary into the processor, said itinerary data including a current destination and a next origin;
  determining one or more O&D services for the itinerary by applying a multi-level test to the itinerary data, wherein applying the multi-level test to the itinerary data includes determining when the current destination and the next origin are both non-coterminous and non-equivalent; and
  outputting the O&D services from the tested itinerary data.

35. A computer-implemented system which implements a program for determining one or more origin and destination (O&D) services for a travel itinerary having segment data stored in a computing system having a processor operating according to an accompanying program instruction set, said system comprising:
  an input system which inputs itinerary data derived from the itinerary into the processor, said itinerary data including a current destination and a next origin;
  an evaluation system which determines one or more O&D services for the itinerary by applying a multi-level test to the itinerary data, wherein the evaluation system determines when the current destination and the next origin are both non-coterminous and non-equivalent; and
  an output system which outputs the O&D services from the tested itinerary data.

36. A method for determining travel cost information for a travel itinerary stored in a computing system having a processor operating according to an accompanying program instruction set, said method comprising the steps of:
  determining one or more O&D services for the travel itinerary by applying a multi-level test to data derived from the travel itinerary, wherein the data derived from the travel itinerary includes a current destination and a next origin, and wherein applying the multi-level test to the data includes determining when the current destination and the next origin are both non-coterminous and non-equivalent;
  inputting itinerary travel costs derived from the travel itinerary into the processor;
  calculating travel costs for the determined O&D services;
  comparing the calculated travel costs with the derived itinerary travel costs to produce travel cost information; and
  outputting the travel cost information.

* * * * *